US012678974B2

(12) United States Patent
Jeon et al.

(10) Patent No.: US 12,678,974 B2
(45) Date of Patent: Jul. 14, 2026

(54) LOW DEFLECTION TOOLING APPARATUS

(71) Applicant: Divergent Technologies, Inc., Los Angeles, CA (US)

(72) Inventors: Patrick Minwoo Jeon, Los Angeles, CA (US); Lukas Philip Czinger, Santa Monica, CA (US); Keith Mckay, Los Angeles, CA (US); Aron Derecichei, Los Alamitos, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 455 days.

(21) Appl. No.: 18/101,087

(22) Filed: Jan. 24, 2023

(65) Prior Publication Data

US 2023/0415356 A1    Dec. 28, 2023

(51) Int. Cl.
 B25J 15/00 (2006.01)
 B25J 19/02 (2006.01)

(52) U.S. Cl.
 CPC ......... B25J 15/0019 (2013.01); B25J 19/021 (2013.01)

(58) Field of Classification Search
 CPC ........................... B25J 15/0019; B25J 19/021
 USPC .......................................... 74/490.01; 901/30
 See application file for complete search history.

(56) References Cited

U.S. PATENT DOCUMENTS

| | | | |
|---|---|---|---|
| 5,203,226 A | 4/1993 | Hongou et al. | |
| 5,742,385 A | 4/1998 | Champa | |

| | | | |
|---|---|---|---|
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |

(Continued)

FOREIGN PATENT DOCUMENTS

| | | |
|---|---|---|
| CN | 108481300 A | 9/2018 |
| DE | 102013020581 A1 | 6/2015 |

(Continued)

OTHER PUBLICATIONS

US 9,202,136 B2, 12/2015, Schmidt et al. (withdrawn)

(Continued)

*Primary Examiner* — T. Scott Fix
(74) *Attorney, Agent, or Firm* — ArentFox Schiff LLP

(57) ABSTRACT

In the present disclosure, systems and apparatuses of a low deflection end-of-arm tooling configured to interface with robots are described. In one aspect, an apparatus may include a shaft with dimensions that include a length greater than a width and having lengthwise distal and proximal ends, and the distal end may be configured to interface with a tool. The apparatus may further includes a flange connected to the proximal end of the shaft and configured to interface with a robotic arm. The apparatus may further include a tool located at the proximal end of the shaft and configured to interface with a plurality of parts associated with vehicular assembly. The shaft may be configured to resist deformation beyond a configured amount when a respective load is applied by each part of the plurality of parts retained by the tool.

20 Claims, 13 Drawing Sheets

400

Low Deflection Tooling Apparatus 402

Vision System 442

Robot Interface 434

Part 480

Distal End 406    Tooling 422

Proximal End 404

Flange 432    Shaft 412

Tooling Interface 424

Load 450    Axis 408

(56) References Cited

U.S. PATENT DOCUMENTS

| | | |
|---|---|---|
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,715,040 B2 * | 5/2014 | Gao ....................... B24B 41/06 |
| | | 901/30 |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |

(56) References Cited

U.S. PATENT DOCUMENTS

| | | | |
|---|---|---|---|
| 9,933,031 | B2 | 4/2018 | Bracamonte et al. |
| 9,933,092 | B2 | 4/2018 | Sindelar |
| 9,957,031 | B2 | 5/2018 | Golshany et al. |
| 9,958,535 | B2 | 5/2018 | Send et al. |
| 9,962,767 | B2 | 5/2018 | Buller et al. |
| 9,963,978 | B2 | 5/2018 | Johnson et al. |
| 9,971,920 | B2 | 5/2018 | Derakhshani et al. |
| 9,976,063 | B2 | 5/2018 | Childers et al. |
| 9,987,792 | B2 | 6/2018 | Flitsch et al. |
| 9,988,136 | B2 | 6/2018 | Tiryaki et al. |
| 9,989,623 | B2 | 6/2018 | Send et al. |
| 9,990,565 | B2 | 6/2018 | Rhoads et al. |
| 9,994,339 | B2 | 6/2018 | Colson et al. |
| 9,996,890 | B1 | 6/2018 | Cinnamon et al. |
| 9,996,945 | B1 | 6/2018 | Holzer et al. |
| 10,002,215 | B2 | 6/2018 | Dowski et al. |
| 10,006,156 | B2 | 6/2018 | Kirkpatrick |
| 10,011,089 | B2 | 7/2018 | Lyons et al. |
| 10,011,685 | B2 | 7/2018 | Childers et al. |
| 10,012,532 | B2 | 7/2018 | Send et al. |
| 10,013,777 | B2 | 7/2018 | Mariampillai et al. |
| 10,015,908 | B2 | 7/2018 | Williams et al. |
| 10,016,852 | B2 | 7/2018 | Broda |
| 10,016,942 | B2 | 7/2018 | Mark et al. |
| 10,017,384 | B1 | 7/2018 | Greer et al. |
| 10,018,576 | B2 | 7/2018 | Herbsommer et al. |
| 10,022,792 | B2 | 7/2018 | Srivas et al. |
| 10,022,912 | B2 | 7/2018 | Kia et al. |
| 10,027,376 | B2 | 7/2018 | Sankaran et al. |
| 10,029,415 | B2 | 7/2018 | Swanson et al. |
| 10,040,239 | B2 | 8/2018 | Brown, Jr. |
| 10,046,412 | B2 | 8/2018 | Blackmore |
| 10,048,769 | B2 | 8/2018 | Selker et al. |
| 10,052,712 | B2 | 8/2018 | Blackmore |
| 10,052,820 | B2 | 8/2018 | Kemmer et al. |
| 10,055,536 | B2 | 8/2018 | Maes et al. |
| 10,058,764 | B2 | 8/2018 | Aders |
| 10,058,920 | B2 | 8/2018 | Buller et al. |
| 10,061,906 | B2 | 8/2018 | Nilsson |
| 10,065,270 | B2 | 9/2018 | Buller et al. |
| 10,065,361 | B2 | 9/2018 | Susnjara et al. |
| 10,065,367 | B2 | 9/2018 | Brown, Jr. |
| 10,068,316 | B1 | 9/2018 | Holzer et al. |
| 10,071,422 | B2 | 9/2018 | Buller et al. |
| 10,071,525 | B2 | 9/2018 | Susnjara et al. |
| 10,072,179 | B2 | 9/2018 | Drijfhout |
| 10,074,128 | B2 | 9/2018 | Colson et al. |
| 10,076,875 | B2 | 9/2018 | Mark et al. |
| 10,076,876 | B2 | 9/2018 | Mark et al. |
| 10,081,140 | B2 | 9/2018 | Paesano et al. |
| 10,081,431 | B2 | 9/2018 | Seack et al. |
| 10,086,568 | B2 | 10/2018 | Snyder et al. |
| 10,087,320 | B2 | 10/2018 | Simmons et al. |
| 10,087,556 | B2 | 10/2018 | Gallucci et al. |
| 10,099,427 | B2 | 10/2018 | Mark et al. |
| 10,100,542 | B2 | 10/2018 | GangaRao et al. |
| 10,100,890 | B2 | 10/2018 | Bracamonte et al. |
| 10,107,344 | B2 | 10/2018 | Bracamonte et al. |
| 10,108,766 | B2 | 10/2018 | Druckman et al. |
| 10,113,600 | B2 | 10/2018 | Bracamonte et al. |
| 10,118,347 | B2 | 11/2018 | Stauffer et al. |
| 10,118,579 | B2 | 11/2018 | Lakic |
| 10,120,078 | B2 | 11/2018 | Bruder et al. |
| 10,124,546 | B2 | 11/2018 | Johnson et al. |
| 10,124,570 | B2 | 11/2018 | Evans et al. |
| 10,137,500 | B2 | 11/2018 | Blackmore |
| 10,138,354 | B2 | 11/2018 | Groos et al. |
| 10,144,126 | B2 | 12/2018 | Krohne et al. |
| 10,145,110 | B2 | 12/2018 | Carney et al. |
| 10,151,363 | B2 | 12/2018 | Bracamonte et al. |
| 10,152,661 | B2 | 12/2018 | Kieser |
| 10,160,278 | B2 | 12/2018 | Coombs et al. |
| 10,161,021 | B2 | 12/2018 | Lin et al. |
| 10,166,752 | B2 | 1/2019 | Evans et al. |
| 10,166,753 | B2 | 1/2019 | Evans et al. |
| 10,171,578 | B1 | 1/2019 | Cook et al. |
| 10,173,255 | B2 | 1/2019 | TenHouten et al. |
| 10,173,327 | B2 | 1/2019 | Kraft et al. |
| 10,178,800 | B2 | 1/2019 | Mahalingam et al. |
| 10,179,640 | B2 | 1/2019 | Wilkerson |
| 10,183,330 | B2 | 1/2019 | Buller et al. |
| 10,183,478 | B2 | 1/2019 | Evans et al. |
| 10,189,187 | B2 | 1/2019 | Keating et al. |
| 10,189,240 | B2 | 1/2019 | Evans et al. |
| 10,189,241 | B2 | 1/2019 | Evans et al. |
| 10,189,242 | B2 | 1/2019 | Evans et al. |
| 10,190,424 | B2 | 1/2019 | Johnson et al. |
| 10,195,693 | B2 | 2/2019 | Buller et al. |
| 10,196,539 | B2 | 2/2019 | Boonen et al. |
| 10,197,338 | B2 | 2/2019 | Melsheimer |
| 10,200,677 | B2 | 2/2019 | Trevor et al. |
| 10,201,932 | B2 | 2/2019 | Flitsch et al. |
| 10,201,941 | B2 | 2/2019 | Evans et al. |
| 10,202,673 | B2 | 2/2019 | Lin et al. |
| 10,204,216 | B2 | 2/2019 | Nejati et al. |
| 10,207,454 | B2 | 2/2019 | Buller et al. |
| 10,209,065 | B2 | 2/2019 | Estevo, Jr. et al. |
| 10,210,662 | B2 | 2/2019 | Holzer et al. |
| 10,213,837 | B2 | 2/2019 | Kondoh |
| 10,214,248 | B2 | 2/2019 | Hall et al. |
| 10,214,252 | B2 | 2/2019 | Schellekens et al. |
| 10,214,275 | B2 | 2/2019 | Goehlich |
| 10,220,575 | B2 | 3/2019 | Reznar |
| 10,220,881 | B2 | 3/2019 | Tyan et al. |
| 10,221,530 | B2 | 3/2019 | Driskell et al. |
| 10,226,900 | B1 | 3/2019 | Nevins |
| 10,232,550 | B2 | 3/2019 | Evans et al. |
| 10,234,342 | B2 | 3/2019 | Moorlag et al. |
| 10,237,477 | B2 | 3/2019 | Trevor et al. |
| 10,252,335 | B2 | 4/2019 | Buller et al. |
| 10,252,336 | B2 | 4/2019 | Buller et al. |
| 10,254,499 | B1 | 4/2019 | Cohen et al. |
| 10,257,499 | B2 | 4/2019 | Hintz et al. |
| 10,259,044 | B2 | 4/2019 | Buller et al. |
| 10,268,181 | B1 | 4/2019 | Nevins |
| 10,269,225 | B2 | 4/2019 | Velez |
| 10,272,860 | B2 | 4/2019 | Mohapatra et al. |
| 10,272,862 | B2 | 4/2019 | Whitehead |
| 10,275,564 | B2 | 4/2019 | Ridgeway et al. |
| 10,279,580 | B2 | 5/2019 | Evans et al. |
| 10,285,219 | B2 | 5/2019 | Fetfatsidis et al. |
| 10,286,452 | B2 | 5/2019 | Buller et al. |
| 10,286,603 | B2 | 5/2019 | Buller et al. |
| 10,286,961 | B2 | 5/2019 | Hillebrecht et al. |
| 10,289,263 | B2 | 5/2019 | Troy et al. |
| 10,289,875 | B2 | 5/2019 | Singh et al. |
| 10,291,193 | B2 | 5/2019 | Dandu et al. |
| 10,294,552 | B2 | 5/2019 | Liu et al. |
| 10,294,982 | B2 | 5/2019 | Gabrys et al. |
| 10,295,989 | B1 | 5/2019 | Nevins |
| 10,303,159 | B2 | 5/2019 | Czinger et al. |
| 10,307,824 | B2 | 6/2019 | Kondoh |
| 10,310,197 | B1 | 6/2019 | Droz et al. |
| 10,313,651 | B2 | 6/2019 | Trevor et al. |
| 10,315,252 | B2 | 6/2019 | Mendelsberg et al. |
| 10,336,050 | B2 | 7/2019 | Susnjara |
| 10,337,542 | B2 | 7/2019 | Hesslewood et al. |
| 10,337,952 | B2 | 7/2019 | Bosetti et al. |
| 10,339,266 | B2 | 7/2019 | Urick et al. |
| 10,343,330 | B2 | 7/2019 | Evans et al. |
| 10,343,331 | B2 | 7/2019 | McCall et al. |
| 10,343,355 | B2 | 7/2019 | Evans et al. |
| 10,343,724 | B2 | 7/2019 | Polewarczyk et al. |
| 10,343,725 | B2 | 7/2019 | Martin et al. |
| 10,350,823 | B2 | 7/2019 | Rolland et al. |
| 10,356,341 | B2 | 7/2019 | Holzer et al. |
| 10,356,395 | B2 | 7/2019 | Holzer et al. |
| 10,357,829 | B2 | 7/2019 | Spink et al. |
| 10,357,957 | B2 | 7/2019 | Buller et al. |
| 10,359,756 | B2 | 7/2019 | Newell et al. |
| 10,369,629 | B2 | 8/2019 | Mendelsberg et al. |
| 10,382,739 | B1 | 8/2019 | Rusu et al. |
| 10,384,393 | B2 | 8/2019 | Xu et al. |
| 10,384,416 | B2 | 8/2019 | Cheung et al. |

(56) References Cited

U.S. PATENT DOCUMENTS

| | | | |
|---|---|---|---|
| 10,389,410 | B2 | 8/2019 | Brooks et al. |
| 10,391,710 | B2 | 8/2019 | Mondesir |
| 10,392,097 | B2 | 8/2019 | Pham et al. |
| 10,392,131 | B2 | 8/2019 | Deck et al. |
| 10,393,315 | B2 | 8/2019 | Tyan |
| 10,400,080 | B2 | 9/2019 | Ramakrishnan et al. |
| 10,401,832 | B2 | 9/2019 | Snyder et al. |
| 10,403,009 | B2 | 9/2019 | Mariampillai et al. |
| 10,406,750 | B2 | 9/2019 | Barton et al. |
| 10,412,283 | B2 | 9/2019 | Send et al. |
| 10,416,095 | B2 | 9/2019 | Herbsommer et al. |
| 10,421,496 | B2 | 9/2019 | Swayne et al. |
| 10,421,863 | B2 | 9/2019 | Hasegawa et al. |
| 10,422,478 | B2 | 9/2019 | Leachman et al. |
| 10,425,793 | B2 | 9/2019 | Sankaran et al. |
| 10,427,364 | B2 | 10/2019 | Alves |
| 10,429,006 | B2 | 10/2019 | Tyan et al. |
| 10,434,573 | B2 | 10/2019 | Buller et al. |
| 10,435,185 | B2 | 10/2019 | Divine et al. |
| 10,435,773 | B2 | 10/2019 | Liu et al. |
| 10,436,038 | B2 | 10/2019 | Buhler et al. |
| 10,438,407 | B2 | 10/2019 | Pavanaskar et al. |
| 10,440,351 | B2 | 10/2019 | Holzer et al. |
| 10,442,002 | B2 | 10/2019 | Benthien et al. |
| 10,442,003 | B2 | 10/2019 | Symeonidis et al. |
| 10,449,696 | B2 | 10/2019 | Elgar et al. |
| 10,449,737 | B2 | 10/2019 | Johnson et al. |
| 10,461,810 | B2 | 10/2019 | Cook et al. |
| 2006/0108783 | A1 | 5/2006 | Ni et al. |
| 2007/0006462 | A1 | 1/2007 | Van Zile |
| 2009/0018697 | A1 | 1/2009 | Prat et al. |
| 2010/0180711 | A1 | 7/2010 | Kilibarda et al. |
| 2012/0029700 | A1 | 2/2012 | Eickhorst |
| 2013/0054029 | A1* | 2/2013 | Huang ................. G05D 1/0038 |
| | | | 901/30 |
| 2014/0277669 | A1 | 9/2014 | Nardi et al. |
| 2015/0121983 | A1 | 5/2015 | Okahisa et al. |
| 2017/0113344 | A1 | 4/2017 | Schönberg |
| 2017/0341309 | A1 | 11/2017 | Piepenbrock et al. |
| 2021/0123719 | A1 | 4/2021 | Desforges et al. |

FOREIGN PATENT DOCUMENTS

| | | | |
|---|---|---|---|
| EP | 1136195 | A1 | 9/2001 |
| EP | 2735410 | A2 | 5/2014 |
| WO | 1996036455 | A1 | 11/1996 |
| WO | 1996036525 | A1 | 11/1996 |
| WO | 1996038260 | A1 | 12/1996 |
| WO | 2003024641 | A1 | 3/2003 |
| WO | 2004108343 | A1 | 12/2004 |
| WO | 2005093773 | A1 | 10/2005 |
| WO | 2007003375 | A1 | 1/2007 |
| WO | 2007110235 | A1 | 10/2007 |
| WO | 2007110236 | A1 | 10/2007 |
| WO | 2008019847 | A1 | 2/2008 |
| WO | 2007128586 | A3 | 6/2008 |
| WO | 2008068314 | A2 | 6/2008 |
| WO | 2008086994 | A1 | 7/2008 |
| WO | 2008087024 | A1 | 7/2008 |
| WO | 2008107130 | A1 | 9/2008 |
| WO | 2008138503 | A1 | 11/2008 |
| WO | 2008145396 | A1 | 12/2008 |
| WO | 2009083609 | A2 | 7/2009 |
| WO | 2009098285 | A1 | 8/2009 |
| WO | 2009112520 | A1 | 9/2009 |
| WO | 2009135938 | A1 | 11/2009 |
| WO | 2009140977 | A1 | 11/2009 |
| WO | 2010125057 | A2 | 11/2010 |
| WO | 2010125058 | A1 | 11/2010 |
| WO | 2010142703 | A2 | 12/2010 |
| WO | 2011032533 | A1 | 3/2011 |
| WO | 2014016437 | A1 | 1/2014 |
| WO | 2014187720 | A1 | 11/2014 |
| WO | 2014195340 | A1 | 12/2014 |
| WO | 2015193331 | A1 | 12/2015 |
| WO | 2016116414 | A1 | 7/2016 |
| WO | 2017036461 | A1 | 3/2017 |
| WO | 2019030248 | A1 | 2/2019 |
| WO | 2019042504 | A1 | 3/2019 |
| WO | 2019048010 | A1 | 3/2019 |
| WO | 2019048498 | A1 | 3/2019 |
| WO | 2019048680 | A1 | 3/2019 |
| WO | 2019048682 | A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report in PCT/US23/61281, mailed May 30, 2023, 12 pages.
Extended European Search Report received for European Application No. 23747813.6, mailed on Jan. 20, 2026, 9 pages.

\* cited by examiner

200

Method 202

310

320

600

Low Deflection Tooling
Apparatus 1002

Robot
Arm
1072

Robot
1070

1000

LOW DEFLECTION TOOLING APPARATUS

CROSS-REFERENCE TO RELATED APPLICATIONS

This application claims the benefit of U.S. Provisional Application Ser. No. 63/303,007, entitled "LOW DEFLECTION TOOLING APPARATUS" and filed on Jan. 25, 2022, the disclosure of which is expressly incorporated by reference herein in its entirety.

BACKGROUND

Field

The present disclosure relates to robots configured for assembly operations, and more specifically to components configured to connect with robotic arms for assembly operations.

Background

A transport structure such as an automobile, truck or aircraft employs a large number of interior and exterior nodes. These nodes provide structure to the automobile, truck and aircraft, and respond appropriately to the many different types of forces that are generated or that result from various actions like accelerating and braking. These nodes also provide support. Nodes of varying sizes and geometries may be integrated in a transport structure, for example, to provide an interface between panels, extrusions, and/or other structures. Thus, nodes are an integral part of transport structures.

Most nodes must be coupled to, or interface securely with, another part or structure in secure, well-designed ways. In order to securely connect a node with another part or structure, the node may need to undergo one or more processes in order to prepare the node to connect with the other part or structure. For example, the node may be machined at an interface in order to connect with various other parts or structures. Further examples of processes include surface preparation operations, heat treatment, electrocoating, electroplating, anodization, chemical etching, cleaning, support removal, powder removal, and so forth.

In order to produce a transport structure (e.g., a vehicle, an aircraft, a metro system, etc.), one or more assembly operations may be performed after a node is constructed. For example, a node may be connected with a part, e.g., in order to form a portion of a transport structure (e.g., a vehicle chassis, etc.). Such assembly may involve a degree of accuracy that is within one or more tolerance thresholds of an assembly system, e.g., in order to ensure that the node is securely connected with the part and, therefore, the transport structure may be satisfactorily produced.

When robots (e.g., robotic arms) perform assembly operations, the robots may engage with different nodes, parts, and/or other structures of varying geometries (e.g., different shapes, sizes, dimensions, etc.). Thus, a need exists for an approach to enabling robots to engage with different nodes, parts, and/or other structures, as well as enabling robots to perform various assembly operations.

SUMMARY

The present disclosure generally relates to assembly operations performed in association with production of transport structures. Such assembly operations may include connection of nodes (e.g., additively manufactured nodes) with parts and/or other structures. Because transport structures are to be safe, reliable, and so forth, approaches to accurately performing various assembly operations associated with production of transport structures may be beneficial. Such approaches to various assembly operations may be performed by at least one robotic arm that may be instructed via computer-generated instructions. Accordingly, a computer may implement various techniques to generate instructions for at least one robotic arm that causes the at least one robotic arm to be correctly position when performing various assembly operations.

The present disclosure describes systems and apparatuses for low deflection end-of-arm tooling configured to interface with robots and/or interface with modular attachments and/or position parts within acceptable tolerances. In some embodiments, an apparatus comprises: a shaft with dimensions that include a length greater than a width and having lengthwise distal and proximal ends, the distal end being configured to interface with a tool; a flange connected to the proximal end of the shaft, the flange being configured to interface with a robotic arm; a tool located at the proximal end of the shaft, the tool being configured to interface with a plurality of parts associated with vehicular assembly, and the shaft being configured to resist vertical bending force applied by each part of the plurality of parts when the part is engaged by the tool.

In some aspects, the shaft comprises a hollow structural section, a lattice structural section, or a stochastic structural section. In some aspects, the length of the shaft is inclusively between 110 millimeters (mm) and 700 mm, and the width of the shaft is inclusively between 10 mm and 100 mm.

In some aspects, the dimensions of the shaft are a function of at least one of a size of the part, an access of assembly associated with the one part, or a reach of the robotic arm. In some aspects, the shaft comprises a rectangular cross section. In some aspects, the shaft tapers from the proximal end to the distal end.

In some aspects, the apparatus further includes a measurement component connected with the shaft between the flange and the tool, and configured to obtain measurement data indicative of a spatial location of the tool. In some aspects, the measurement component comprises at least a portion of a laser guidance system configured to position the tool. In some aspects, the measurement component comprises an optical sensor angled inclusively between five (5) and thirty (30) degrees above a lengthwise neutral axis of the shaft.

In some other embodiments, the apparatus comprises: a substantially straight rigidity element; a robotic arm interface extending radially outward from one side of the rigidity element; and a common parts interface connected to another side of the rigidity element, the common parts interface being configured to secure each of a plurality of parts through an access area to a position associated with an assembly in a robotic cell, the rigidity element being configured avoid deflection from a downward force applied by any of the plurality of parts that is secured by the common parts interface.

In still further embodiments, the apparatus may include an end effector comprising: a substantially straight extension, greater in length relative to width, configured to be connected with an assembly robot in a robotic assembly cell, and having a stiffness coefficient sufficient to support each of a plurality of parts used for vehicular assembly in the robotic assembly cell with an angular deflection of inclusively within a range of 0.2 degrees (°) to 0.01° from a neutral axis of the extension; and a fixtureless vehicular part interface configured to connect to each of the plurality of parts.

It will be understood that other aspects of apparatuses configured to interface with robots and facilitate various operations associated with pre- and post-processing and assembly of additively manufactured parts will become readily apparent to those skilled in the art from the following detailed description, wherein it is shown and described only several embodiments by way of illustration. As will be realized by those skilled in the art, the disclosed subject matter is capable of other and different embodiments and its several details are capable of modification in various other respects, all without departing from the invention. Accordingly, the drawings and detailed description are to be regarded as illustrative in nature and not as restrictive.

DETAILED DESCRIPTION

Figure 1:
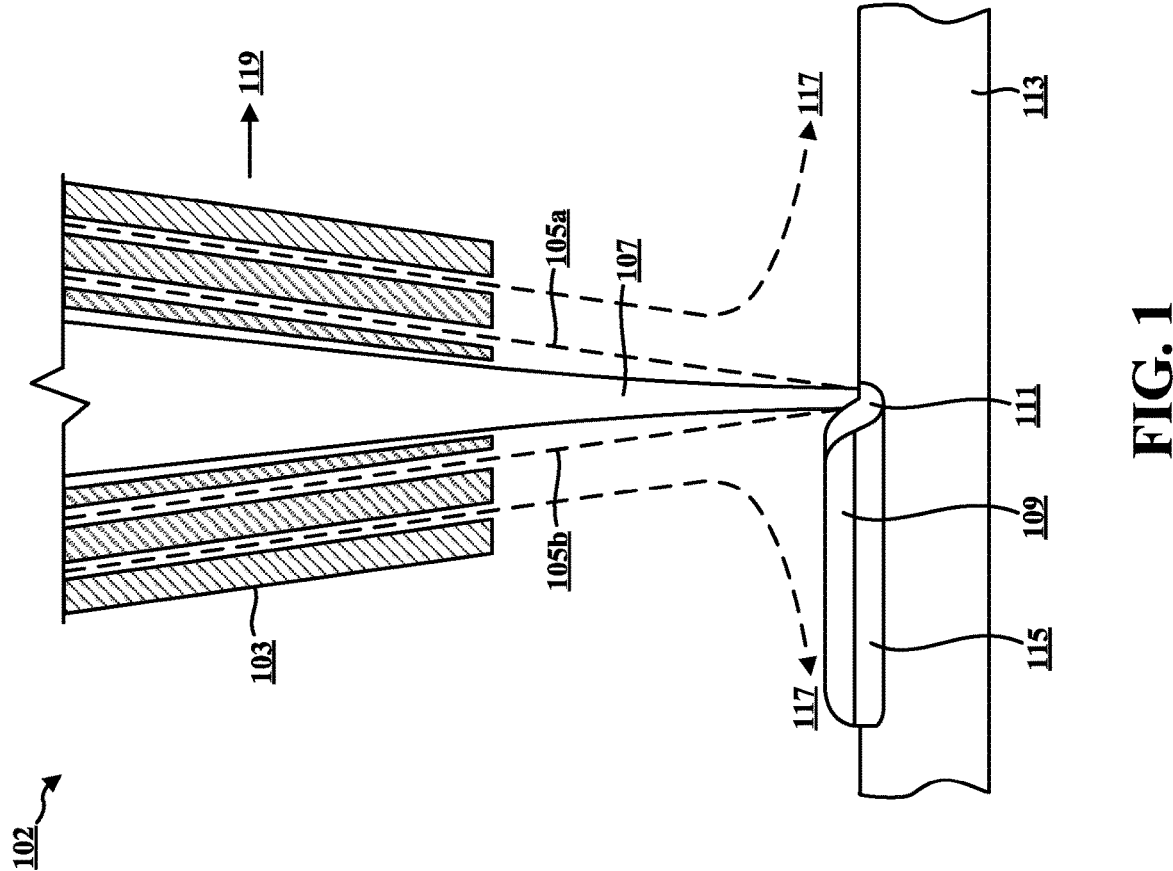
FIG. 1 illustrates an exemplary embodiment of certain aspects of a Direct Metal Deposition (DMD) 3-D printer.

The detailed description set forth below in connection with the appended drawings is intended to provide a description of various exemplary embodiments and is not intended to represent the only embodiments in which the invention may be practiced. The terms "exemplary," "illustrative," and the like used throughout the present disclosure mean "serving as an example, instance, or illustration," and should not necessarily be construed as preferred or advantageous over other embodiments presented in the present disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout the present disclosure. In addition, the figures may not be drawn to scale and instead may be drawn in a way that attempts to most effectively highlight various features relevant to the subject matter described.

Additive Manufacturing (3-D Printing). Additive manufacturing (AM) is advantageously a non-design specific manufacturing technique. AM provides the ability to create complex structures within a part. For example, nodes can be produced using AM. A node is a structure that may include one or more interfaces used to connect to other spanning components such as tubes, extrusions, panels, other nodes, and the like. Using AM, a node may be constructed to include additional features and functions, depending on the objectives. For example, a node may be printed with one or more ports that enable the node to secure two parts by injecting an adhesive rather than welding multiple parts together, as is traditionally done in manufacturing complex products. Alternatively, some components may be connected to a node using a brazing slurry, a thermoplastic, a thermoset, or another connection feature, any of which can be used interchangeably in place of an adhesive. Thus, while welding techniques may be suitable with respect to certain embodiments, additive manufacturing provides significant flexibility in enabling the use of alternative or additional connection techniques.

A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with little or no wasted motion. As another illustration, electron beam additive manufacturing processes use an electron beam to fuse metal via wire feedstock or sintering on a powder bed in a vacuum chamber. Atomic Diffusion Additive Manufacturing (ADAM) is still another recently developed technology in which components are printed, layer-by-layer, using a metal powder in a plastic binder. After printing, plastic binders are removed and the entire part (e.g., structure) is sintered at once into a desired metal.

One of several such AM techniques, as noted, is DMD. FIG. 1 illustrates an example embodiment 100 of certain aspects of a DMD 3-D printer 102. DMD printer 102 uses a feed nozzle 103 moving in a predefined direction 119 to propel powder streams 105*a* and 105*b* into a laser beam 107, which is directed toward a workpiece 113 that may be supported by a substrate. Feed nozzle may also include mechanisms for streaming a shield gas 117 to protect the welded area from oxygen, water vapor, or other components.

The powdered metal is then fused by the laser 107 in a melt pool region 111, which may then bond to the workpiece 113 as a region of deposited material 109. A dilution area 115 may include a region of the workpiece where the deposited powder is integrated with the local material of the workpiece. Feed nozzle 103 may be supported by a computer numerical controlled (CNC) robot or a gantry, or other computer-controlled mechanism. Feed nozzle 103 may be moved under computer control multiple times along a predetermined direction of the substrate until an initial layer of the deposited material 109 is formed over a desired area of workpiece 113. Feed nozzle 103 can then scan the region immediately above the prior layer to deposit successive layers until the desired structure is formed. In general, feed nozzle 103 may be configured to move with respect to all three axes, and in some instances to rotate on its own axis by a predetermined amount.

Figure 2:
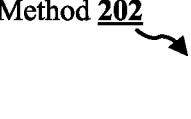
FIG. 2 illustrates a conceptual flow diagram of a 3-D printing process using a 3-D printer.
Figure 2:
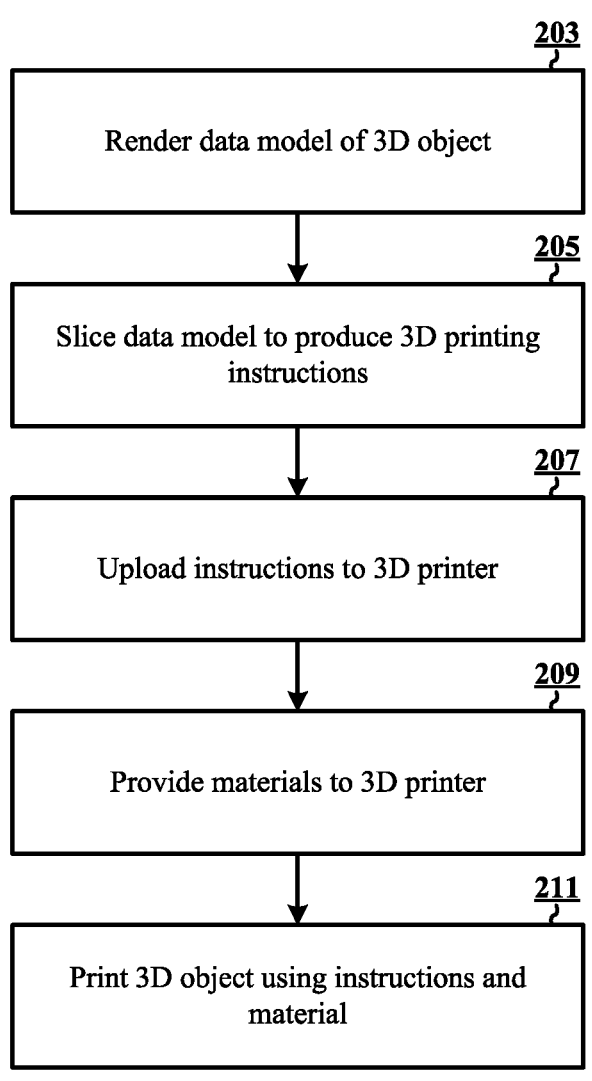

FIG. 2 is a flow diagram 200 illustrating an example method 202 of 3-D printing. A data model of the desired 3-D object to be printed is rendered (203). A data model is a virtual design of the 3-D object. Thus, the data model may reflect the geometrical and structural features of the 3-D object, as well as its material composition. The data model may be created using a variety of methods, including computer-aided engineering (CAE) based optimization, 3-D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available stereolithography-based CAD software. A CAD program may be used to create the data model of the 3-D object as an STL file. Thereupon, the STL file may undergo a process whereby errors in the file are identified and resolved.

Following error resolution, the data model can be "sliced" (205) by a software application known as a slicer to thereby produce a set of instructions for 3-D printing the object, with the instructions being compatible and associated with the particular 3-D printing technology to be utilized. Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses.

A common type of file used for slicing data models into layers is a G-code file, which is a numerical control programming language that includes instructions for 3-D printing the object. The G-code file, or other file constituting the instructions, is uploaded (207) to the 3-D printer. Because the file containing these instructions is typically configured to be operable with a specific 3-D printing process, it will be appreciated that many formats of the instruction file are possible depending on the 3-D printing technology used.

In addition to the printing instructions that dictate what and how an object is to be printed, the appropriate physical materials necessary for use by the 3-D printer in printing the object are provided (209) to the 3-D printer using any of several conventional and often printer-specific methods. In DMD techniques, for example, one or more metal powders may be provided for layering structures with such metals or metal alloys. In selective laser melting (SLM), selective laser sintering (SLS), and other PBF-based AM methods (see below), the materials may be provided as powders into chambers that feed the powders to a build platform. Depending on the 3-D printer, other techniques for providing printing materials may be used.

The respective data slices of the 3-D object are then printed (211) based on the provided instructions using the material(s). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part (e.g., structure, node, etc.) is removed from the printer. In fused deposition modelling, as described above, parts are printed by applying successive layers of model and support materials to a substrate. In general, any suitable 3-D printing technology may be employed for purposes of the present disclosure.

Another AM technique is powder-bed fusion (PBF). Like DMD, PBF creates "build pieces" layer-by-layer. Each layer or "slice" is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 3A-D illustrate respective side views of an example PBF system 302 during different stages of operation. As noted above, the particular embodiment illustrated in FIGS. 3A-D is one of many suitable examples of a PBF system acceptable for use in the present disclosure. It should also be noted that elements of FIGS. 3A-D and the other figures in the present disclosure are not necessarily drawn to scale, but may be drawn larger or smaller for the purpose of better illustration of concepts described herein. PBF system 302 can include a depositor 301 that can deposit each layer of metal powder, an energy beam source 303 that can generate an energy beam, a deflector 305 that can apply the energy beam to fuse the powder, and a build plate 307 that can support one or more build pieces, such as a build piece 309. PBF system 302 can also include a build floor 311 positioned within a powder bed receptacle. Walls 329 of the powder bed receptacle generally define the boundaries of the powder bed receptacle, which is sandwiched between walls 329 from the side and abuts a portion of build floor 311 below. Build floor 311 can progressively lower build plate 307 so that depositor 301 can deposit a next layer. The entire mechanism may reside in a chamber 313 that can enclose the other components, thereby protecting the equipment, enabling atmospheric and temperature regulation and mitigating contamination risks. Depositor 301 can include a hopper 315 that contains a powder 317, such as a metal powder, and a leveler 319 that can level the top of each layer of deposited powder.

Figure 3A:
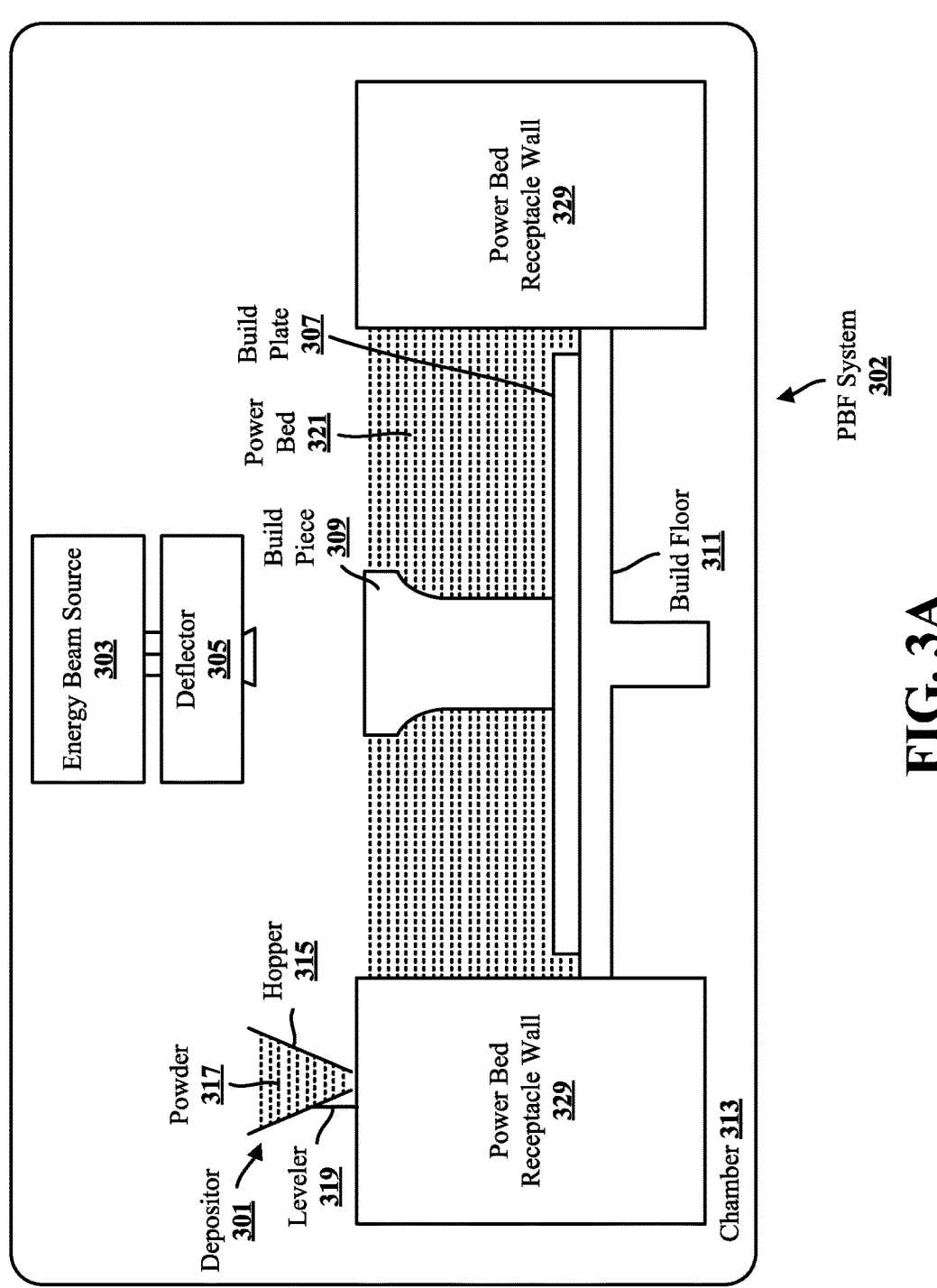
FIGS. 3A, 3B, 3C, and 3D illustrate exemplary powder bed fusion (PBF) systems during different stages of operation.

Referring specifically to FIG. 3A, an example embodiment 310 shows PBF system 302 after a slice of build piece 309 has been fused, but before the next layer of powder has been deposited. In fact, FIG. 3A illustrates a time at which PBF system 302 has already deposited and fused slices in multiple layers, e.g., 150 layers, to form the current state of build piece 309, e.g., formed of 150 slices. The multiple layers already deposited have created a powder bed 321, which includes powder that was deposited but not fused.

Figure 3B:
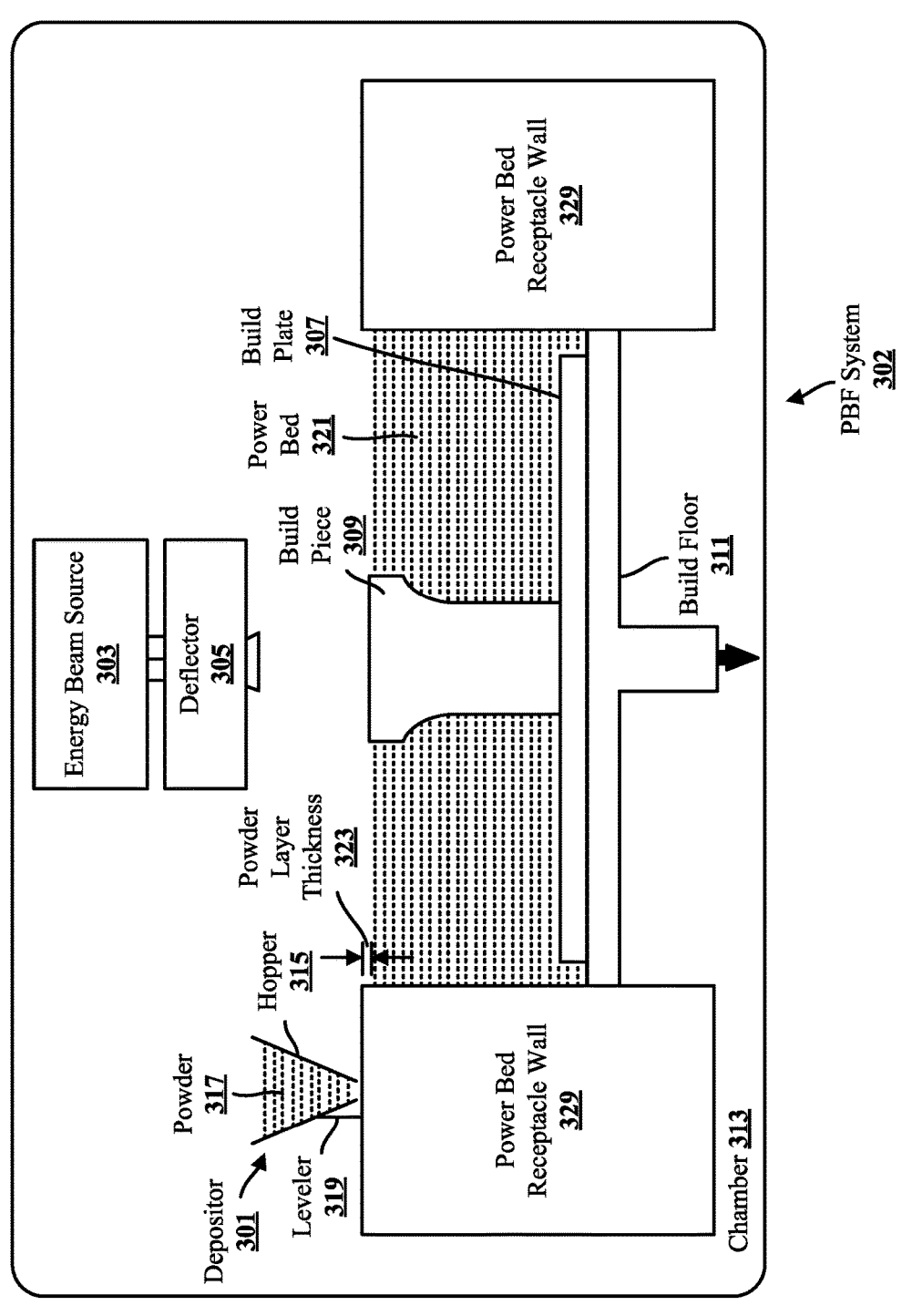

FIG. 3B shows an example embodiment 320 of a PBF system 302 at a stage in which build floor 311 can lower by a powder layer thickness 323. The lowering of build floor 311 causes build piece 309 and powder bed 321 to drop by powder layer thickness 323, so that the top of build piece 309 and powder bed 321 are lower than the top of powder bed receptacle wall 329 by an amount equal to powder layer thickness 323. In this way, for example, a space with a consistent thickness equal to powder layer thickness 323 can be created over the tops of build piece 309 and powder bed 321.

Figure 3C:
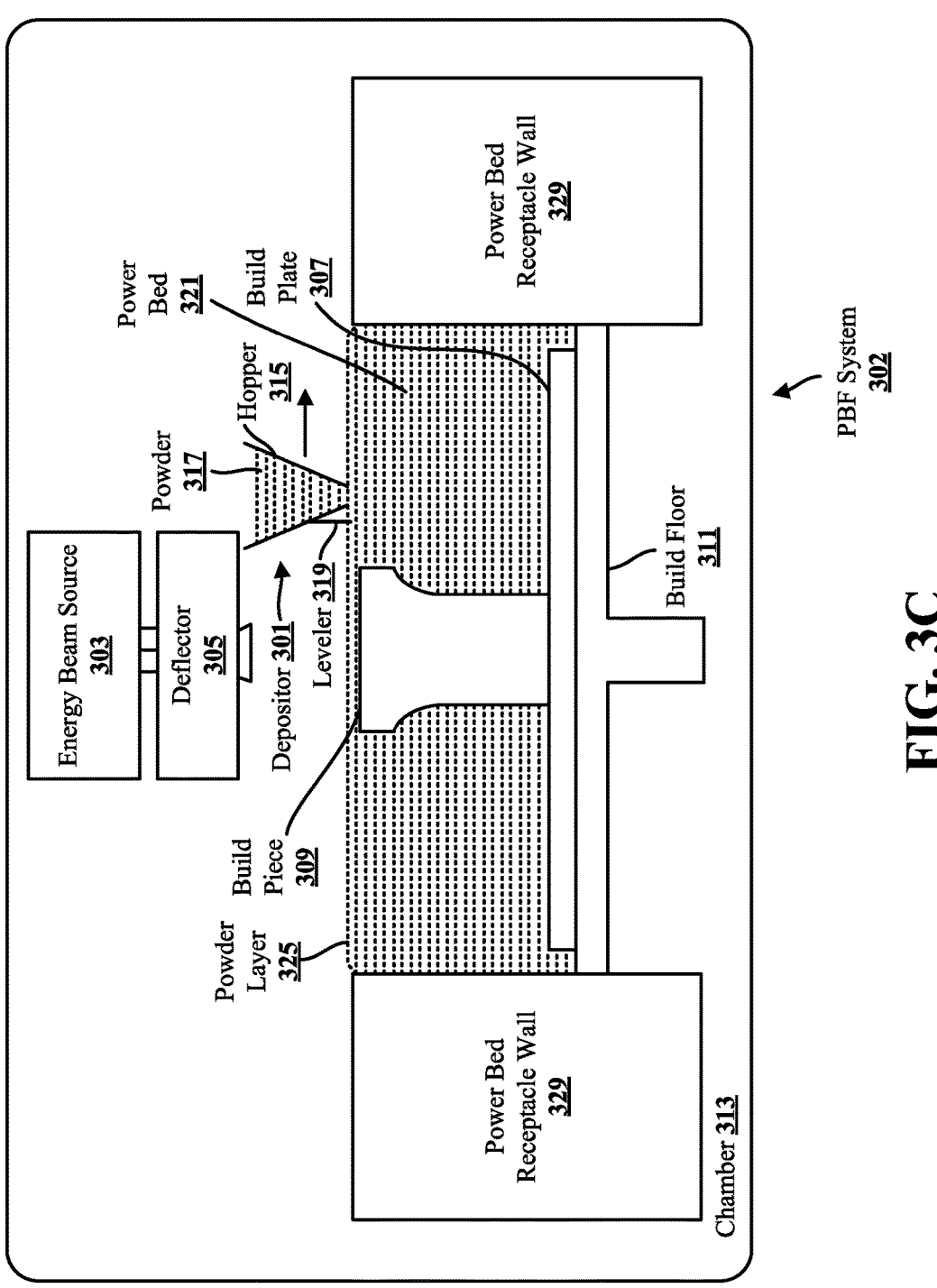

FIG. 3C shows an example embodiment 330 of a PBF system 302 at a stage in which depositor 301 is positioned to deposit powder 317 in a space created over the top surfaces of build piece 309 and powder bed 321 and bounded by powder bed receptacle walls 329. In this example, depositor 301 progressively moves over the defined space while releasing powder 317 from hopper 315. Leveler 319 can level the released powder to form a powder layer 325 that has a thickness substantially equal to powder layer thickness 323 (as shown in FIG. 3B above). Thus, the powder in a PBF system can be supported by a powder support structure, which can include, for example, build plate 307, build floor 311, build piece 309, walls 329, and the like. It should be noted that the illustrated thickness of powder layer 325 (i.e., powder layer thickness 323 (FIG. 3B)) is greater than an actual thickness used for the example involving 150 previously-deposited layers, discussed above with reference to FIG. 3A.

Figure 3D:
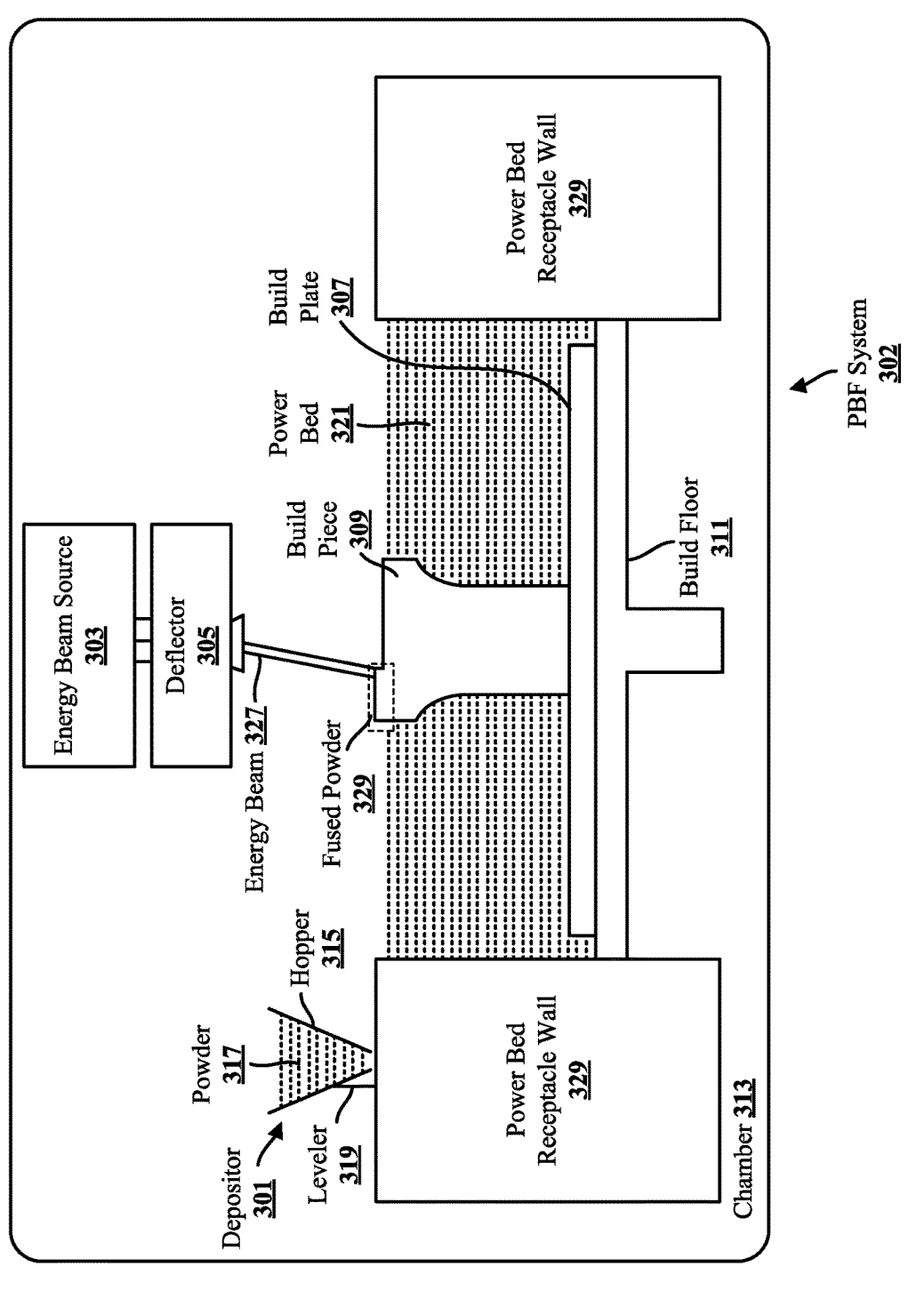

FIG. 3D shows an example embodiment 340 of a PBF system 302 at a stage in which, following the deposition of powder layer 325 (FIG. 3C), energy beam source 303 generates an energy beam 327 and deflector 305 applies the energy beam to fuse the next slice in build piece 309. In various example embodiments, energy beam source 303 can be an electron beam source, in which case energy beam 327 constitutes an electron beam. Deflector 305 can include deflection plates that can generate an electric field or a magnetic field that selectively deflects the electron beam to cause the electron beam to scan across areas designated to be fused. In various embodiments, energy beam source 303 can be a laser, in which case energy beam 327 is a laser beam. Deflector 305 can include an optical system that uses reflection and/or refraction to manipulate the laser beam to scan selected areas to be fused.

In various embodiments, deflector 305 can include one or more gimbals and actuators that can rotate and/or translate the energy beam source to position the energy beam. In various embodiments, energy beam source 303 and/or deflector 305 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

The present disclosure provides various different embodiments of a the low deflection tooling apparatus, which may be connected with a robot for assembly processes, including pre- and/or post-processing operations. It will be appreciated that various embodiments described herein may be practiced together. For example, an embodiment described with respect to one illustration of the present disclosure may be implemented in another embodiment described with respect to another illustration of the present disclosure.

Figure 4:
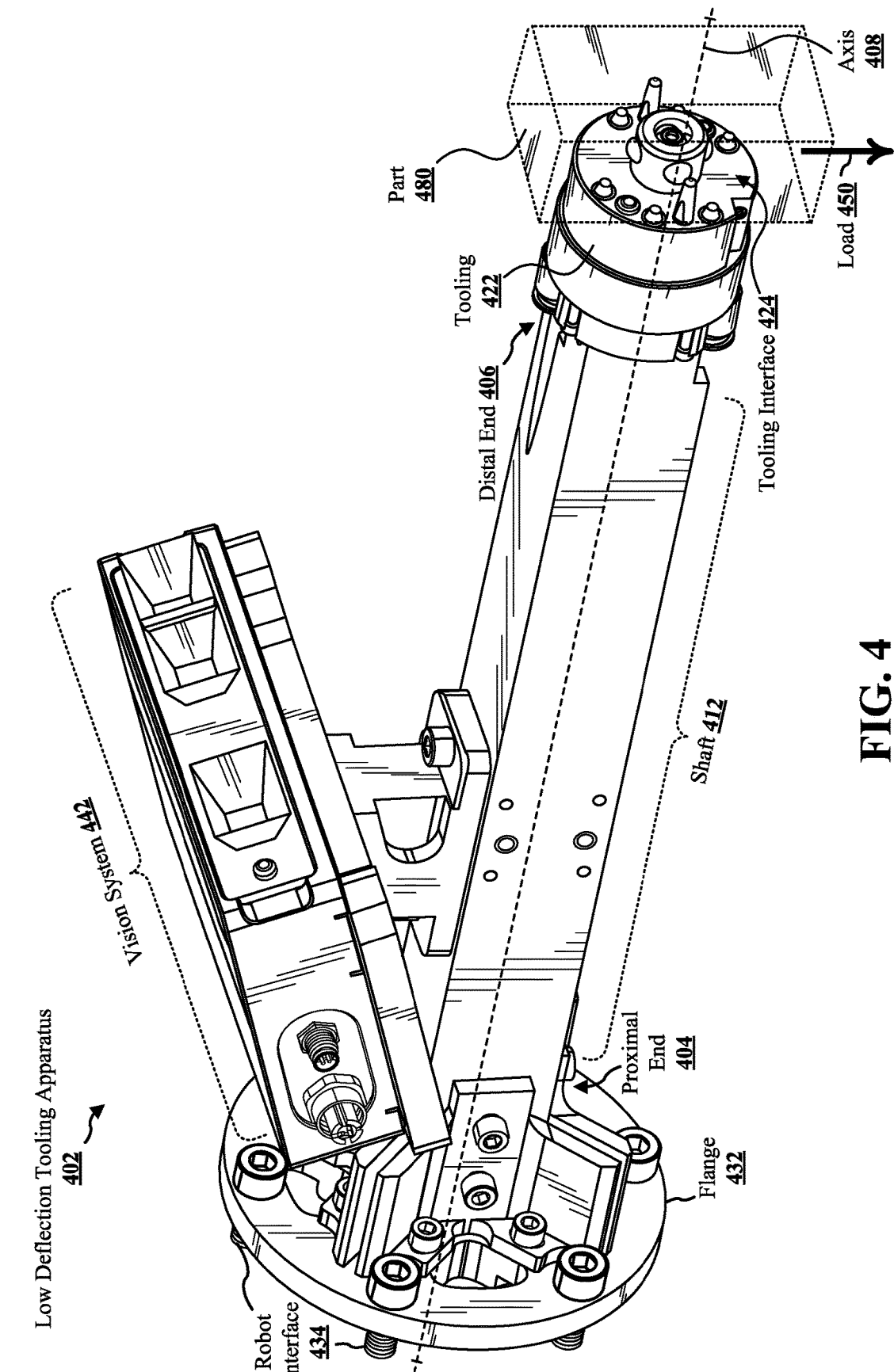
FIG. 4 illustrates an example of a first perspective of a low deflection tooling apparatus.

FIG. 4 illustrates a perspective view 400 of a low deflection tooling apparatus 402. Low deflection tooling apparatus 402 may be employed in various operations associated with assembly of a node-based transport structure. Low deflection implies that a part will be physically located at a position at which the part is predicted to be, e.g., according to one or more simulations or estimations modeling the assembly process.

As illustrated, low deflection tooling apparatus 402 shows various example embodiments, and other embodiments are possible without departing from the scope of the present disclosure. For example, embodiments of low deflection tooling apparatus 402 may not include a vision system 442; rather, the vision system 442 may be illustrative.

In various embodiments, low deflection tooling apparatus 402 may be composed of a plurality of components. Because low deflection tooling apparatus 402 may be implemented in assembly of node-based transport structures (e.g., automated assembly), one or more of the components may be machined with a relatively great deal of precision, e.g., in order to allow relatively accurate positioning of nodes, parts, and/or other structures during pre-assembly, assembly, and/or post-assembly operations associated with node-based transport structures.

The components of low deflection tooling apparatus 402 may be composed of any material suitable for supporting modular attachment devices, e.g., modular attachment devices that may engage with nodes, parts, structures, and/or be used in any number of various pre-assembly, assembly, and/or post-assembly operations. In some examples, one or more of the components may be constructed of steel, such as 300 series stainless steel (e.g., 304 stainless steel) and/or one or more metal alloys. In some other examples, one or more components of low deflection tooling apparatus 402 may be constructed of aluminum, titanium, a composite metal, or another metal. In still other examples, one or more of the components may be constructed of plastic, glass, or another suitable material.

Low deflection tooling apparatus 402 may include a shaft 412, which may be substantially straight and rigid and may also be known as an extension in some embodiments. Shaft 412 may be machined with a relatively great deal of precision. Therefore, shaft 412 may be suitable for various operations associated with assembly of node-based transport structures.

At opposite ends, shaft 412 may have proximal end 404, intended to be closest to a flange 432, and a distal end 406, intended to be furthest from flange 432. Thus, proximal end 404 may be connected with flange 432, whereas distal end 406 may be separated from flange 432 by shaft 412. Flange 432 may be configured to connect with one or more robots or types of robots so that low deflection tooling apparatus 402 may be used across multiple assembly processes, e.g., of the same or different types of transport structures.

Shaft 412 may be approximately rectangular in shape— for example, a cross section of the shaft 412 may resemble a square or other rectangular shape with corners that are rounded or corners that meet at angle of ninety (90) degrees (°). Illustratively, each of the length and the width of shaft 412 may be inclusively between ten (10) mm and 100 mm. In one example, shaft 412 may include a square cross section, in which each of the sides is approximately thirty five (35) mm at a distal end 406, but increases in size when approaching a proximal end 404. In some other embodiments, however, shaft 412 may be consistent with another shape, such as a pyramid (e.g., with a triangular cross section) or a cylinder (e.g., with a circular cross section).

Shaft 412 may be greater in length than in both width and height, for example, when shaft 412 has a substantially rectangular shape. In some aspects, shaft 412 may have a length that is configured from a function of at least one size(s) of at least one part(s), at least one size(s) of at least one access space(s) in which at least one part(s) is to be positioned to be joined with another part(s), a reach or effective length of a robotic arm to which low deflection tooling apparatus 402 is connected, and/or one or more other variables or considerations. According to various embodiments, shaft 412 may be inclusively between 110 millimeters (mm) and 700 mm in length. In one example, shaft 412 may be 361.38 millimeters (mm) in length or shaft 412 may be less than 361.38 mm in length. However, shaft 412 may be configured with a length that does not constrain or hinder motion by a robot to which low deflection tooling apparatus 402 is connected. Some lengths may necessitate a change of spacing between robots (e.g., in an assembly cell), e.g., to prevent low deflection tooling apparatus 402 from unintentionally striking any surrounding robots or other objects.

The length of shaft 412 may be intended to provide separation between flange 432 and tooling 422 to which a part may be connected in order to avoid accounting for flange 432 in positioning a part with low deflection tooling apparatus 402, and avoid increasing a minimum (possible) part to part grip space. Absent this separation between flange 432 and tooling 422, flange 432 may need to be accommodated during various assembly operations, thereby necessitating an increase in a minimum part-to-part grip spacing. However, shaft 412 may constrain robot motion and compel an increase in the spacing between robots in an assembly cell in which low deflection tooling apparatus 402 is deployed.

Flange 432 may be configured to interface with one or more robots (e.g., at robotic arms) associated with assembly of node-based transport structures. That is, flange 432 may be configured to interface with one robot having a specific connection mechanism or flange 432 may be configured to interface with robots of different brands, sizes, and/or configurations.

In particular, flange 432 may include a robot interface 434. As a non-limiting example, the robot interface 434 may include a plurality of bolts, as illustrated in FIG. 4. In other embodiments, robot interface 434 may include any type and/or any number of mating features enabling a connection to a robot that is sufficient to support forces applied during the various operations associated with assembly of transport structures (e.g., automobiles and other vehicles). For example, robot interface 434 may include male and/or female features, such as protrusions, through holes, or other such features.

Potentially, flange 432 may be separable from proximal end 404. Thus, flange 432 may be replaced by another flange or another component configured to connected with one or more robots different from the one or more to which flange 432 is configured to connect. In some other embodiments, flange 432 may be integrated with shaft 412 at the proximal end 404, such as where shaft 412 is additively manufactured as a unitary piece that includes shaft 412 and flange 432 or where shaft 412 is machined with flange 432 as on solid piece.

Positioned opposite of proximal end 404 on shaft 412 is distal end 406. In some embodiments, distal end 406 may be connected with or may include tooling 422. Tooling 422 may include end-of-arm tooling (EOAT) and/or an end effector, such as those suitable for robotic applications and in the context of assembly operations, and pre- and post-processing operations, with additively manufactured parts (e.g., nodes, structures, and the like from which a transport structure may be assembled).

Tooling 422 may include any end effector or other tool that may be used at any point during one or more assembly operations, pre-processing operations, and/or post-processing operations associated with assembling additively manufactured parts. For example, tooling 422 may include tool changers, grippers, torches, sensors, curing tools, applicators (e.g., electromagnetic wave applicators, thermal applicators, etc.), substance dispensers (e.g., adhesive dispensers), injection tools, and/or other tools, such as those configured to be positioned at the end of a robotic arm.

In some embodiments, tooling 422 may be configured to engage (e.g., pick, attach to, connect with, etc.) a part and retain that part until the part is moved into a suitable position for the assembly process, such as a position at which the part may be connected to another part of which a transport structure is composed. Tooling 422 may retain the part at the position while the part is joined with the other part until such time that the part remains suitably joined to the other part without the aid of tooling 422, such as after an adhesive joining the two parts has been applied and sufficiently cured.

Low deflection tooling apparatus 402 may include or may be connected with one or more components that facilitate the positioning (e.g., moving, rotating, orienting, etc.) the part. For example, low deflection tooling apparatus 402 may be connected with a vision system 442. In some embodiments, vision system 442 may capture imaging data indicative of a part's position (e.g., location, orientation, etc.). Such imaging data indicative of a part's position, for example, to engage (e.g., pick up) a part and/or join a retained (e.g., picked up, held, etc.) part with another part (e.g., a part of a transport structure or other assembly structure).

Vision system 442 may be relatively closer to flange 432 than a tool center point (TCP), which may be a center point on tooling interface 424 of tooling 422. Illustratively, vision system 442 may be approximately 100 mm to 150 mm (e.g., 132.7 mm) from flange 432, but may be approximately 190 mm to 240 mm (e.g., 228.68 mm) from the TCP.

According to various embodiments, tooling 422 may be configured for fixtureless assembly operations. That is, parts to be joined in association with assembly of a transport structure may be additively manufactured with one or more features that may facilitate or enable various assembly operations (e.g., joining, adhering, positioning, etc.) without the use of fixtures, such as one or more features to prevent unintended movement of a part and/or deflection of the part during one or more fixtureless assembly operations. For example, one or more parts to be joined in association with fixtureless assembly of a transport structure may be additively manufactured with one or more features designed to provide stability, strength, and/or rigidity during various fixtureless assembly operations. Examples of such features may include mesh, honeycomb, and/or lattice substructures, which may be co-printed with a part (e.g., when the part is additively manufactured) and which may be internal and/or external to the part.

Fixtureless assembly may be contrasted with fixtured assembly operations, which are reliant upon fixtures that are separate from the part and must be separately connected thereto. Fixtures enable an end effector to engage, retain, and/or position the part, as well as reduce or avoid unintended movement, deflection, and/or displacement of a part. Such separate fixtures may contribute to increased complexity and time overhead of assembly operations, as each part is connected to a respective fixture in advance of an assembly operation with the part. Further, fixtures generally must be removed from a part (e.g., during assembly and/or post-processing operations), which may be a complicated process as free space in and around a transport structure is reduced as the assembly process progresses. Moreover, fixtured assembly involves multiple fixtures tailored to multiple different parts, and multiple different end effectors may be necessary to engage and retain many of the part fixtures involved with assembly operations. Consequently, the end effectors on one or more robots may need to be changed during assembly, which may further contribute to the overhead involved with fixtured assembly.

In various embodiments of the present disclosure, fixtured assembly may be avoided in favor of fixtureless assembly, as described above. As certain features may be co-printed with parts being assembled, such features may be designed to interface with one or a small number of end effectors. The features may later be covered, removed, or left on a part, e.g., which may be faster relative to fixture removal when the features are co-printed with the part. To that end, low deflection tooling apparatus 402 may include tooling 422 that is configured to engage, retain, stabilize, and/or position multiple fixtureless parts during fixtureless assembly. For example, tooling 422 may include a tooling interface 424.

Tooling interface 424 may be configured to engage and retain any number of different parts without fixtures. For example, tooling interface 424 may include one or more male and/or female features, which may be complementary to corresponding female and/or male features included on a part. Illustratively, tooling interface 424 may include one or more male features implemented as extrusions that protrude from a surface of tooling 422, and the protrusions may be configured and positioned to engage with corresponding female features included on a part, such as one or more holes, cavities, openings, channels, etc. that are configured to receive a corresponding protrusion of tooling interface 424.

Illustratively, tooling 422 may include a picker or gripper configured to engage with complementary features located on a surface of a part. The tooling interface 424 may be positioned by a robot—e.g., according to instructions from a computer system—in such a way as to fit the tooling interface 424 with the features present on the part. For example, tooling 422 may fixturelessly engage a part via tooling interface 424, and tooling 422 may fixturelessly retain the part at tooling interface 424 until a position is reached at which instructions are issued to release the part.

As tooling 422 may be configured to engage and retain multiple different parts, the specifications may vary across different parts. For example, the weights of parts may be appreciably different such that force(s) acting on the low deflection tooling apparatus 402 differ by non-negligible amounts. Joining parts during fixtureless assembly operations may be conditioned upon certain degrees of precision. For example, vision system 442 and/or a metrology system (e.g., as further described with respect to FIG. 6, infra) may provide information indicative of a position of a part; however, such information may be based on an understanding that the part is physically located at the point of retention on tooling 422.

According to the understanding that the part is physically located at the point of retention on tooling 422, low deflection tooling apparatus 402 is assumed to have certain specifications or measurements that fall within an acceptable range(s) of tolerance(s). For example, low deflection tooling apparatus 402 may have a total length of 370 mm from a point at which flange 432 is connected with a robotic arm to a point at which the part is retained by tooling 422 at tooling interface 424. Accordingly, the physical location of the part may be derived based on the assumption that a surface of the part at which the part is retained by tooling 422 at tooling interface 424 is located 370 mm from the robotic arm.

Similarly, low deflection tooling apparatus 402 may be assumed to have a specific angle(s) relative to a point(s) of origin. For example, a point of origin may be defined at proximal end 404 of shaft 412 or at flange 432 connected with a robotic arm. In some embodiments, low deflection tooling apparatus 402 may be substantially straight such that the elevational and azimuthal angles are zero degrees (0°) when the gravitational force is acting on low deflection tooling apparatus 402.

However, low deflection tooling apparatus 402 may freely extend from flange 432. As low deflection tooling apparatus 402 protrudes from the robotic arm unsupported, a point on low deflection tooling apparatus 402 relatively nearer to proximal end 404 than distal end 406 is likely to become a fulcrum when a force is applied relatively nearer to distal end 406 than proximal end 404. In particular, once tooling 422 has picked up and retained a part 480, the otherwise unsupported part 480 may cause at least one load 450 to act upon low deflection tooling apparatus 402.

In some embodiments, part 480 may be any part used in assembly of a transport structure. For example, part 480 may be a node, structure, extrusion, tube, or other element of which a vehicle chassis is composed. Part 480 may be composed of a metal or alloy, a plastic, carbon fiber, or another material suitable for transport structure applications. Additionally, part 480 may be additively manufactured, potentially with one or more features facilitating engagement and retention by tooling 422. In some other aspects, part 480 may be a commercial off-the-shelf (COTS) part.

Part 480 may have a weight that does not exceed a payload capacity of tooling 422, or of low deflection tooling apparatus 402, including under acceleration when a robotic arm effects movement of low deflection tooling apparatus 402 with tooling 422 retaining part 480. Illustratively, part 480 may have a weight of approximately five (5) kilograms (kg). In some other embodiments, however, low deflection tooling apparatus 402 may be configured to accommodate parts having weights greater or less than 5 kg without departing from the scope of the present disclosure.

Load 450 may be exerted on low deflection tooling apparatus 402 in at least the elevational plane. When low deflection tooling apparatus 402, and by extension part 480, is at rest, load 450 acting upon low deflection tooling apparatus 402 may be vertically exerted in a substantially downward direction (e.g., due to the gravitational force acting upon part 480, among the other components). Particularly, load 450 may cause the greatest amount of force to be applied at distal end 406, with a fulcrum being present where flange 432 interfaces with a robotic arm.

If load 450 is sufficiently great, low deflection tooling apparatus 402 may bend. For example, shaft 412 may deform due to load 450, thereby displacing distal end 406 such that tooling 422 (and by extension, part 480) is moved to a position that is inconsistent with the specifications or characteristics assumed for low deflection tooling apparatus 402. While some difference between the assumed and physical locations of tooling 422 (and part 480) may be acceptable given assembly system tolerances, a sufficiently great load can cause tooling 422 and/or part 480 to be displaced such that the position(s) fall outside the tolerance(s) of the assembly system.

In some instances, the assembly process may be modeled or simulated with a computer system, and the assembly process may be performed directly from the simulation. Thus, unintended deflections of end effectors or other tooling that cause departures from the acceptable tolerances of the assembly system would occur when the assembly process is actually performed, potentially resulting in damage to parts, lost time, and/or other negative consequences in the assembly process.

For example, if another end effector were used and a load caused the end effector to unexpectedly deform, the part may fall outside of the assumed position. When a robot moves the part to be joined with another part, the part may collide with a section of the other part with which the part is not intended to be joined, which may damage one or both parts. Similarly, in areas with relatively small clearances, the robot may cause the part to collide with another obstruction, such as another section of a transport structure under assembly, another robotic arm, etc. In some other instances, deflection may cause binding, such as when a load is added or removed that causes loading between the part and the end effector. Such loading between the part and the end effector may result in damage to, or plastic deformation of, the part if the robot releases (or fails to release) the part at the "correct" position intended by the computer system simulation.

In order to prevent the aforementioned and other deleterious effects, low deflection tooling apparatus 402 may be at least in part substantially stiff or rigid, e.g., such that a part retained by low deflection tooling apparatus 402 is positioned where intended according to a computer system simulation of the assembly process. For example, shaft 412 may be substantially rigid with a stiffness sufficient to resist deformation in response to load 450. In some embodiments, the stiffness may be a function of the length of low deflection tooling apparatus 402, the materials of which low deflection tooling apparatus 402 is composed, and the interior configuration of shaft 412 (e.g., hollow, stochastic, lattice, and/or honeycomb, as described with respect to FIG. 8, infra). However, additional or alternative characteristics may contribute to the stiffness of low deflection tooling apparatus 402.

In some embodiments, the load capacity of low deflection tooling apparatus 402, which may include the maximum load that low deflection tooling apparatus 402 is designed to accommodate while retaining and positioning part 480, may be a function of at least tooling 422 and its payload capacity under robot accelerations (causing acceleration of low deflection tooling apparatus 402). In one illustrative, non-limiting example, load 450 may reach approximately 40 pounds (lbs.), e.g., under robot acceleration, while low deflection tooling apparatus 402 may have a deflection such that part 480 can be positioned within acceptable tolerances. According to various different embodiments, for example, when load 450 is approximately 40 lbs., low deflection tooling apparatus 402 may deflect one of 0.025 mm, 0.05 mm, 0.0631 mm, mm, 0.1 mm, or 0.12 mm without causing part 480 to be positioned outside of acceptable tolerances. Thus, in different embodiments, the maximum deflection of low deflection tooling apparatus 402 with a load of 40 lbs. may be inclusively within a range of 0.025 mm to 0.12 mm.

Given that part 480 is retained by tooling 422 at a position within acceptable tolerances for joining part 480 with another part, low deflection tooling apparatus 402—e.g., including shaft 412—may feature a stiffness (or stiffness coefficient) of at least approximately 2819 Newton (N)/mm, e.g., in the vertical bending direction. However, the stiffness (or stiffness coefficient) of low deflection tooling apparatus 402 may be greater than or less than 2819 N/mm in some other embodiments without departing from the scope of the present disclosure.

Additionally or alternatively, low deflection tooling apparatus 402 may be configured for an angular deflection that does not exceed an angular deflection threshold from a neutral axis 408 when a maximum load for which low deflection tooling apparatus 402 is designed is applied, such as when part 480 is retained by tooling 422. For example, low deflection tooling apparatus 402 may be configured for an angular deflection that does not exceed the threshold number of degrees with a load that does not exceed forty (40) lbs. According to various different embodiments, for example, when load 450 is approximately 40 lbs., low deflection tooling apparatus 402 may angularly deflect by one of 0.2°, 0.15°, 0.1°, 0.5°, 0.05°, or 0.01° from neutral axis 408 without causing part 480 to be positioned outside of acceptable tolerances. Thus, in different embodiments, the maximum angular deflection from neutral axis 408 of low deflection tooling apparatus 402 with a load of 40 lbs. may be inclusively within a range of 0.2° to 0.01°. In other examples, however, the maximum load that low deflection tooling apparatus 402 is able to support without exceeding the angular deflection threshold (e.g., within the range 0.2° to 0.01°) may be greater than or less than 40 lbs.

Figure 5:
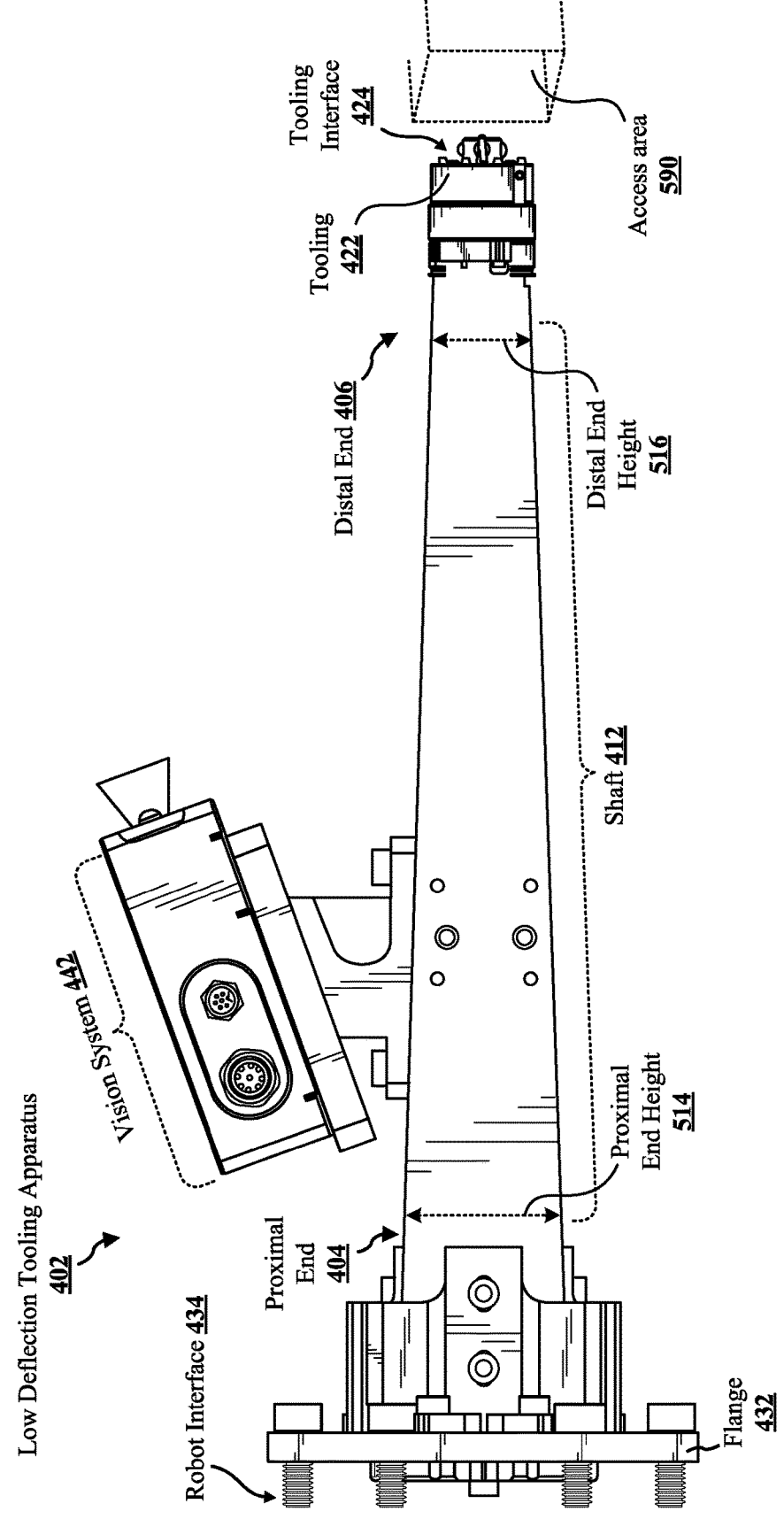
FIG. 5 illustrates an example of a second perspective of a low deflection tooling apparatus.

With reference to FIG. 5, an example of a side perspective 500 of low deflection tooling apparatus 402 is illustrated. As illustrated by side perspective 500, some embodiments of low deflection tooling apparatus 402 may include one or more components that are tapered toward tooling 422. By tapering to smaller dimensions away from flange 432, low deflection tooling apparatus 402 may join parts together in spaces with smaller clearances than flange 432 would otherwise permit, as the length of shaft 412 provides separation between tooling 422 at which a part is retained and flange 432, which may be greater in size than tooling 422 in order to anchor low deflection tooling apparatus 402 to a robot.

In particular, shaft 412 may taper from proximal end 404 (e.g., a point on shaft 412 nearest the connection between low deflection tooling apparatus 402 and a robotic arm) to distal end 406 (e.g., a point on shaft 412 furthest from the connection between low deflection tooling apparatus 402 and a robotic arm). Illustratively, shaft 412 may have a first height 514 at proximal end 404 but may have a second height 516 at distal end 406, and first height 514 may be measurably greater than second height 516. According to various embodiments, first height 514 may be 1.25, 1.5, 1.75, or 2 times greater than second height 516; however, other dimensions are possible without departing from the scope of the present disclosure.

In some embodiments, the width and the height of shaft 412 may taper equally or in proportion to one another. For example, the width of shaft 412 at proximal end 404 may be 1.25, 1.5, 1.75, or 2 times greater than the width of shaft 412 at distal end 406; however, other dimensions are possible without departing from the scope of the present disclosure. In some other embodiments, the width of shaft 412 may taper differently from the height of shaft 412. In still other embodiments, the width of shaft 412 may not taper, whereas the height of shaft 412 may taper, or vice versa.

With the taper, a robot may move tooling 422 into an access area 590 having a tight clearances with respect to low deflection tooling apparatus 402 and other EOAT. For example, access area 590 may have one or more dimensions that prohibits traversal at proximal end 404 (e.g., due to the first height 514 at proximal end 404), whereas distal end 406 may have a height 516 that is permissible for traversal of access area 590 so that tooling 422 (e.g., with a part retained thereby) is to be positioned therein.

Figure 6:
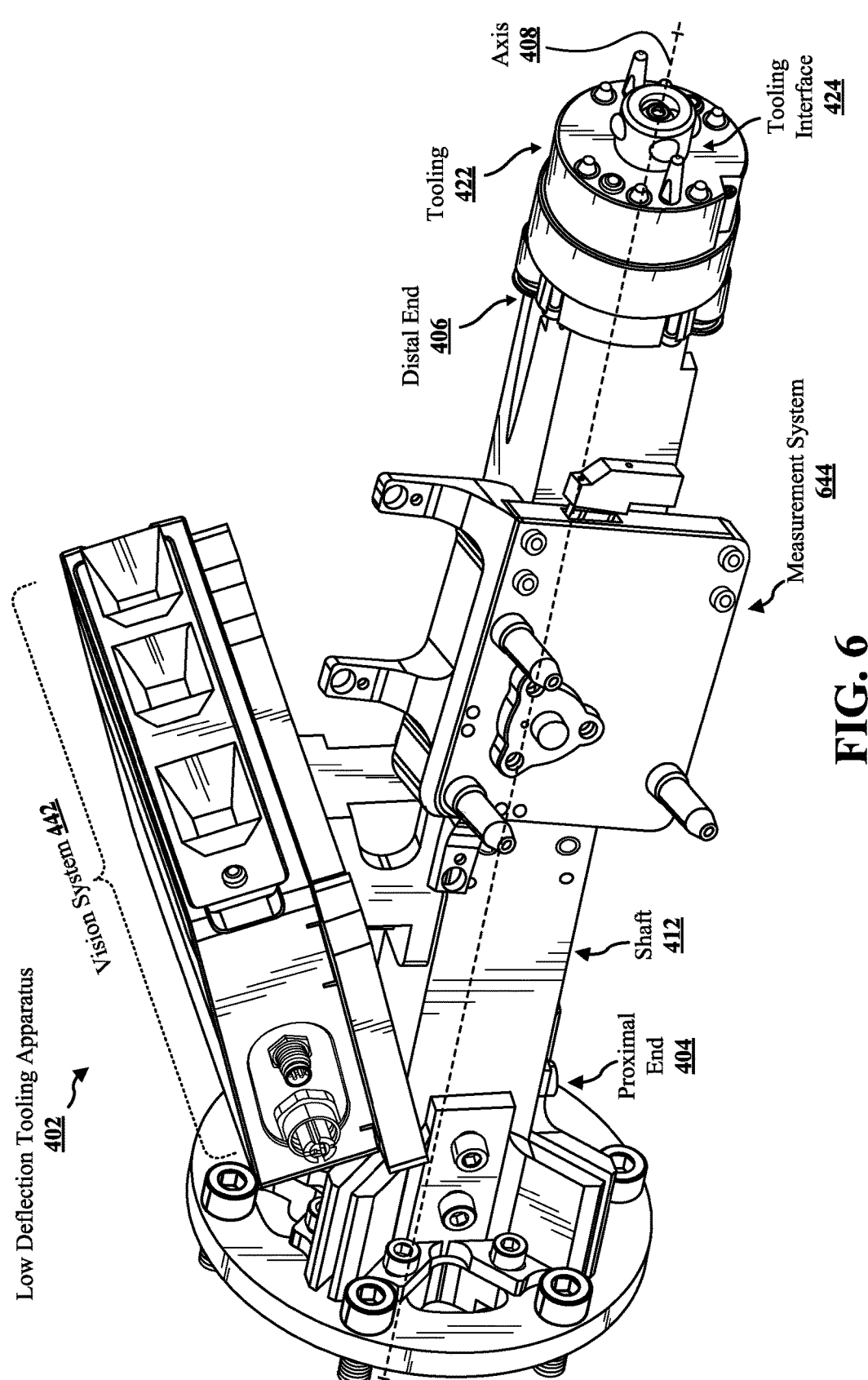
FIG. 6 illustrates an example perspective of a low deflection tooling apparatus including vision and measurement systems for positioning assistance.

FIG. 6 illustrates an example perspective 600 of a low deflection tooling apparatus 402 including vision system 442 and a measurement system 644 for positioning and guidance. According to various embodiments, vision system 442 may include one or more cameras, such as a photography camera, a video camera, etc., and/or another system suitable for collecting imaging data in an assembly cell (e.g., imaging data indicative of an part's position). In some other embodiments, vision system 442 may additionally or alternatively include one or more of a laser guidance system, laser sensor(s), optical sensor(s), tracker-machine control (T-MAC) sensor(s), and the like.

Vision system 442 may be oriented so that the line of sight of vision system 442 is angled away from shaft 412, for example, enable vision system 442 to capture some imaging data that includes markers in an assembly cell. Illustratively, vision system 442 may include one or more sensors angled between five (5) and thirty (30) degrees above lengthwise neutral axis 408 of shaft 412. That is, if a point on shaft 412 is considered the origin, then vision system 442 may include a sensor angled between and 30° above the origin. For example, vision system 442 may be oriented such that the line of sight of at least one sensor has an elevational angle of twenty (20) degrees relative to a horizontal axis through shaft 412.

Measurement system 644 may include a metrology and/or scanning system (e.g., 3-D scanning system, laser scanning system, etc.), a radar system, a laser imaging, detection, and ranging (LIDAR) system (sometimes referred to as a "light detection and ranging" system), and/or another system suitable for collecting imaging data indicative of a part's position. To that end, measurement system 644 may include one or more sensors, such as an optical sensor, a laser sensor, an infrared sensor, a triangulation sensor, a T-MAC sensor, and so forth. Potentially, vision system 442 and measurement system 644 may be implemented as a single component, which may have multiple sensors.

One or both of vision system 442 and/or measurement system 644 may be configured to capture data that a computer system may use to drive movement of a robot to which low deflection tooling apparatus 402 is connected. For example, vision system 442 and/or measurement system 644 may facilitate the positioning (e.g., moving, rotating, orienting, etc.) of a part in an assembly cell, such as by moving the part to a position at which it may be joined with another part.

In some embodiments, vision system 442 may capture imaging data indicative of a part's position (e.g., location, orientation, etc.). Such imaging data indicative of a part's position may be used to find a part's position in an absolute coordinate system (e.g., a geographic coordinate system, a bounded coordinate system, etc.) and/or a relative position (e.g., relative to another part with which the part is to be joined, relative to one or more markers from which a position of the part can be derived, etc.).

Vision system 442 may be configured to provide information indicative of a part's position and/or orientation to a computer system, such as a computer system configured to control a robot to which low deflection tooling apparatus 402 is connected. The computer system may process the received information, such as by identification and/or extraction (e.g., feature extraction) of information from which the computer system is able to determine the type of part, the size of the part, the orientation of the part, the location of the part, and/or other similar information. Based on such information, the computer system may generate instructions that drive movement of the robot, and therefore, cause the low deflection tooling apparatus 402 to move to a location and orient tooling 422 in a way that enables tooling 422 to engage and retain the part, such as by picking up the part from a parts table in an assembly cell.

Additionally or alternatively, vision system 442 may capture information indicative of another part's location, size, orientation etc., such as a targeted part with which the part retained by tooling 422 is to be joined. For example, vision system 442 may capture imaging data of a targeted part with which a part retained by tooling 422 is to be joined, and the computer system may process the received imaging data, such as by determining the orientation of the targeted part, the location of the targeted part, the features with which to join the part with the targeted part, and/or other similar information. Based on such information, the computer system may generate instructions that drive movement of the robot, and therefore, cause the low deflection tooling apparatus 402 to move to a and tooling 422 in a way that enables joining the part with the targeted part.

Measurement system 644 may capture metrology data indicative of various measurements in an assembly cell. For example, measurement system 644 may capture metrology data indicative of a size of a clearance to reach a targeted part, a distance from a potential obstruction, a distance from a targeted part with which a retained part is to be joined, and/or other such data that may be used in joining a part with a transport structure in an assembly cell.

In some embodiments, vision system 442 and/or measurement system 644 may be utilized in a "move-measure-correct" procedure in which a move can be engaged and retained by tooling 422 and/or correct a position of the part so that the part can be brought to a suitable point at which to be joined with another part. Potentially, positioning the part may be an iterative process during which the vision system 442 captures information at multiple points in time over which multiple sets of instructions are issued to cause the robot to repeatedly reposition the low deflection tooling apparatus 402 until the part is brought to a suitable point to be joined with the other part.

Such a move-measure-correct procedure may involve at least measurement system 644, which may obtain measurements used for corrective movement(s) of a part retained by low deflection tooling apparatus 402. The measurements may be provided to a computer system, and the computer system may instruct the robot to move in such a way that the part retained by low deflection tooling apparatus 402 travels along a joining vector. The joining vector may be a path in space that the part travels to be joined with another part (e.g., a part of a transport structure or other assembly structure).

As the robot move the part retained by low deflection tooling apparatus 402, measurement system 644 may capture additional metrology data, such as by periodically scanning a targeted part and/or marker(s). The additional metrology data may be used to move the robot so as to correct the position of the part when the position of the part falls outside the acceptable tolerances for the joining vector. Metrology and/or imaging data may then be used to join the part with another part once the part is determined to have reached a position at which such joining is possible.

The move-measure-correct procedure may enable positioning of parts that is sufficiently accurate (and potentially repeatable) for joining without the use of any fixtures in an assembly cell. Further, the move-measure-correct procedure may be performed dynamically or in real time, e.g., so that corrective movement(s) of a part may be quickly directed based on one or more measurements.

Figure 7:
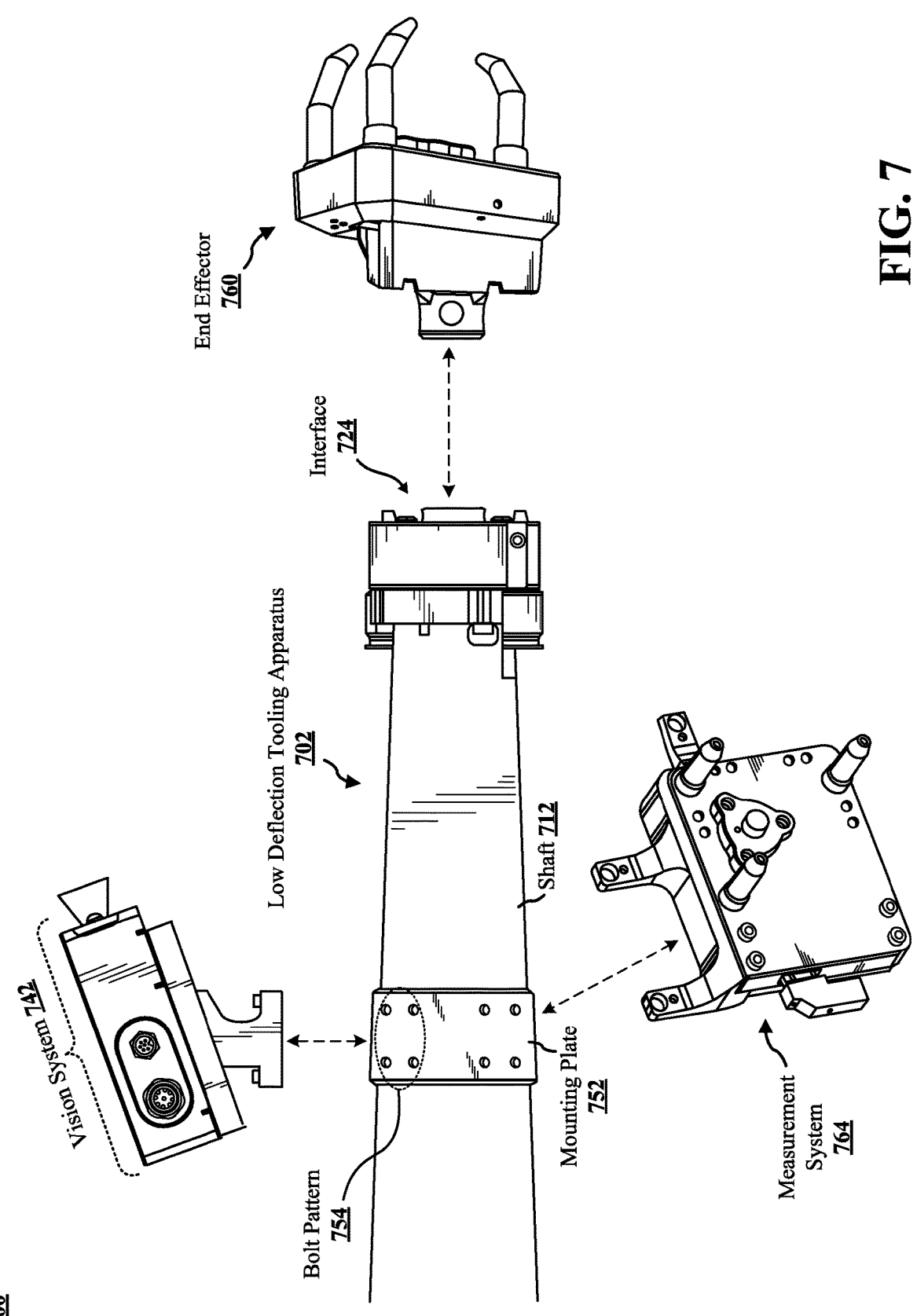
FIG. 7 illustrates an example of a low deflection tooling apparatus having a modularity configuration for connecting with various components.

FIG. 7 illustrates an example embodiment 700 of a low deflection tooling apparatus 702 having a modularity configuration for connecting with various components. In some embodiments, low deflection tooling apparatus 702 may be modularly structured to allow for use with multiple different robots, types of robots, and/or peripheral system(s). As illustrated, low deflection tooling apparatus 702 includes an interface 724 for connecting or attaching tooling. Thus, low deflection tooling apparatus 702 may be separable from EOAT.

For example, interface 724 may be configured to connect with an end effector 760. In some other examples, interface 724 may be additionally or alternatively configured to connect with tool changers, grippers, torches, sensors, curing tools, applicators (e.g., electromagnetic wave applicators, thermal applicators, etc.), substance dispensers (e.g., adhesive dispensers), injection tools, and/or other tools or tool-related components.

Additionally or alternatively, low deflection tooling apparatus 702 may include a flexible mounting area, e.g., for connecting or attaching one or more other components, peripheral systems, and/or tooling or tool-related components. In some embodiments, low deflection tooling apparatus 702 may include a shaft 712 that is substantially rectangular or square (e.g., through a cross section), which may allow for different patterns of fastening mechanisms (e.g., bolts, screws, etc.) to be installed. For example, low deflection tooling apparatus 702 may be configured with one or more bolt patterns 754 on one or more surfaces or sides of shaft 712.

In some embodiments, the fastening mechanisms may be disposed on a mounting plate 752 on shaft 712. Mounting plate 752 may be separable from shaft 712 or may be permanently affixed to shaft 712 (e.g., welded) or may be co-printed on shaft 712 (e.g., where shaft 712 is additively manufactured). Mounting plate 752 may provide a stable and/or secure base for various peripheral systems attached to low deflection tooling apparatus 702. In addition, mounting plate 752 may be placed at a specific or known location on shaft 712, e.g., so that mounting plate 752 may provide a reference point for a vision system 742 and/or measurement system 764 from which the distance to a TCP may be accurately calculated.

In some embodiments, one or both of vision system 742 and/or measurement system 764 may be components that are separable from low deflection tooling apparatus 702. For example, vision system 742 and/or measurement system 764 may be fastened to mounting plate 752 on shaft 712 using bolts, screws, and/or other fastening means. Additional or alternative systems may be attached to low deflection tooling apparatus 702, e.g., at mounting plate 752 or another mounting plate.

Figure 8:
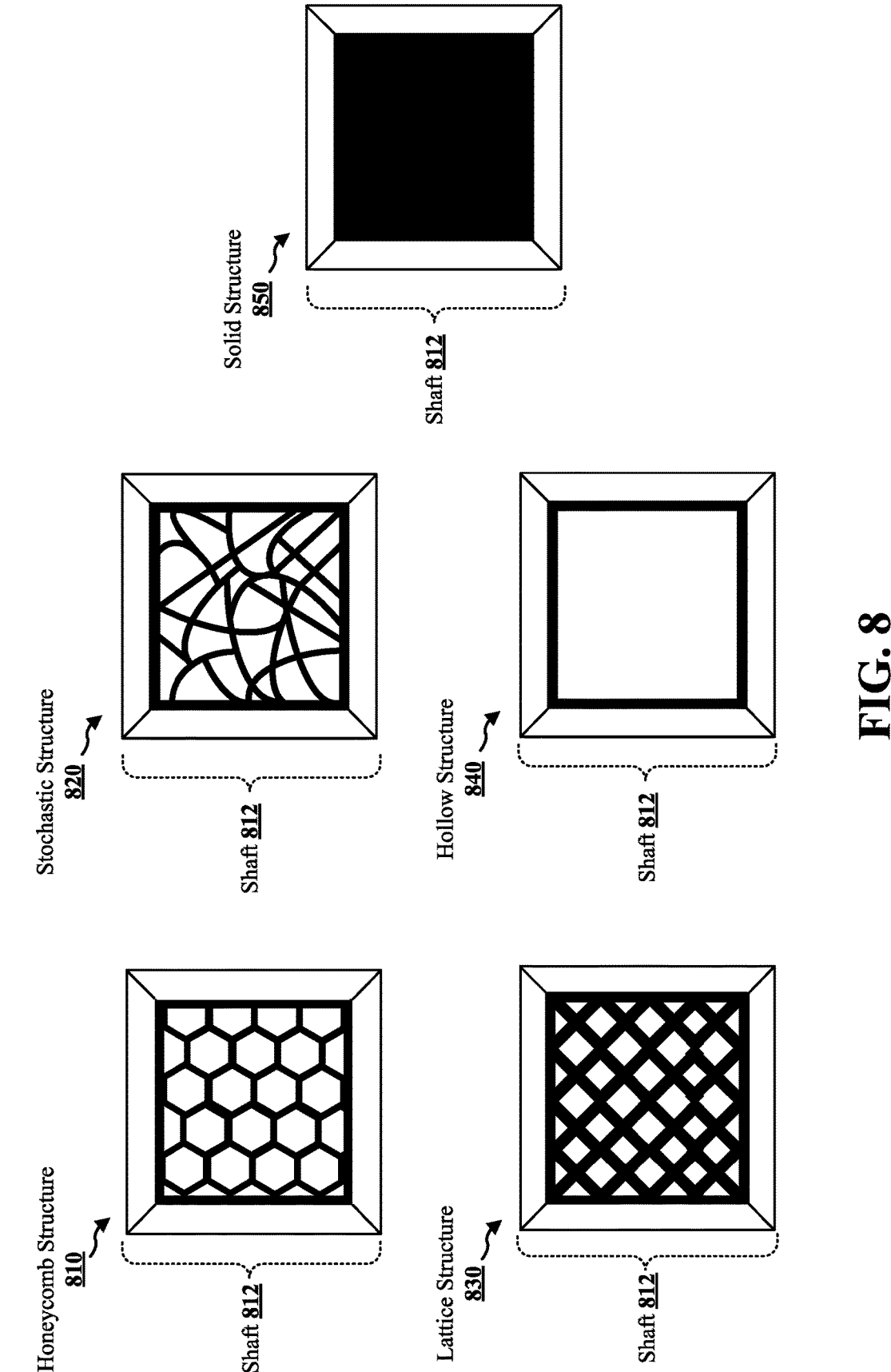
FIG. 8 illustrates various examples of cross sections of low deflection tooling apparatuses configured to connect with a robotic arm.

FIG. 8 illustrates various example embodiments 800 of cross sections of a shaft 812 of a low deflection tooling apparatus. In some embodiments, the interior of shaft 812 may include a honeycomb structure 810. In other embodiments, the interior of shaft 812 may include a stochastic structure 820. Stochastic structure 820 may include be generated using random variability, which may or may not be based on a seed. In still other embodiments, the interior of shaft 812 may include a lattice structure 830. Lattice structure 830 is illustrative, and other lattice structures may be used to fill the interior of shaft 812 without departing from the scope of the present disclosure.

In some embodiments, a structure (e.g., honeycomb structure 810, stochastic structure 820, and/or lattice structure 830) may be part of shaft 812 itself. For example, shaft 812 may be additively manufactured and the structure may be co-printed with shaft 812. In some other embodiments, a structure (e.g., honeycomb structure 810, stochastic structure 820, and/or lattice structure 830) may be manufactured or fabricated separately from shaft 812, but may be permanently secured therein, e.g., using adhesive(s) and/or welding. In some further embodiments, shaft 812 may be a hollow structure 840, e.g., in which no additional structures fill the interior of shaft 812. In yet further embodiments, shaft 812 may be a solid structure 850, e.g., in which the interior of shaft 812 is a solid material, such as a solid alloy. For example, solid structure 850 may be additively manufactured as the interior of shaft 812.

In still other embodiments, a structure (e.g., honeycomb structure 810, stochastic structure 820, and/or lattice structure 830) may be manufactured (e.g., additively manufactured) or fabricated separately from shaft 812, and may be removable therefrom. For example, a flange connected to one end of shaft 812 may be removable to expose hollow structure 840, and the structure may be inserted into the exposed hollow structure 840 to fill the interior of shaft 812. As the stiffness of shaft 812 may be at least partially derived through the interior structure, adding or removing a structure (e.g., honeycomb structure 810, stochastic structure 820, and/or lattice structure 830) into shaft 812 may allow for the stiffness to be changed for different applications in one or multiple assembly processes.

Figure 9:
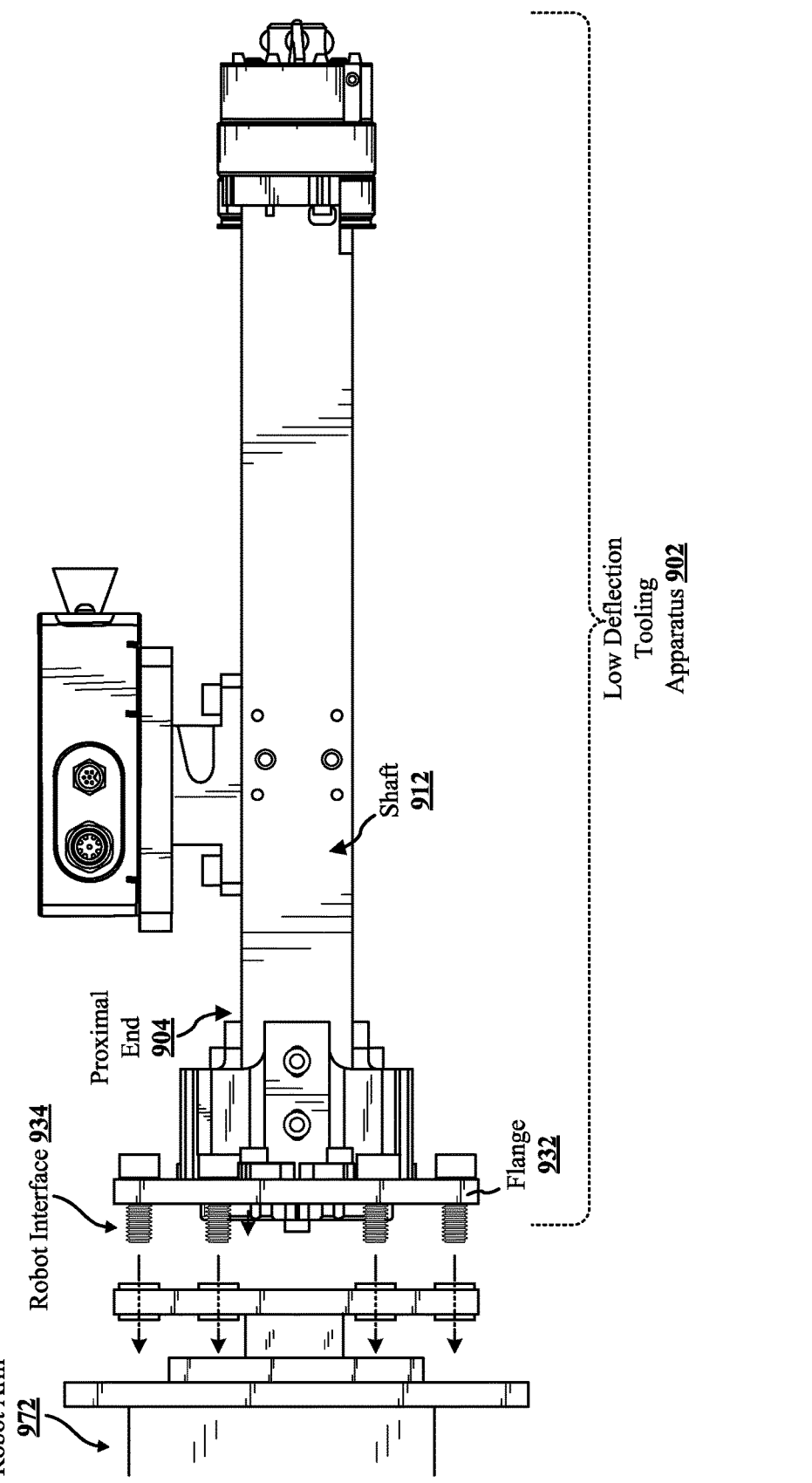
FIG. 9 illustrates an example of a low deflection tooling apparatus connecting to a robot arm.

FIG. 9 illustrates an example embodiment 900 of a low deflection tooling apparatus 902 connecting to a robotic arm 972. Low deflection tooling apparatus 902 may include or may be connected to a flange 932 at a proximal end 904 of a shaft 912. Flange 932 may include a robot interface 934, which may include one or more features enabling low deflection tooling apparatus 902 to be mounted on and/or secured to a robot arm 972. The features of robot interface 934 may include bolts, through holes (e.g., threaded or unthreaded), and/or other male and/or female features that provide fastening mechanisms to attach low deflection tooling apparatus 902 to robot arm 972.

While robot interface 934 is illustrated as having multiple bolts protruding therefrom to be inserted into multiple complementary through holes on robot arm 972, other configurations of fastening mechanisms are possible without departing from the scope of the present disclosure. For example, robot arm 972 may include the multiple bolts protruding therefrom, whereas robot interface 934 may include the multiple complementary through holes through which the bolts are to be inserted.

Robot interface 934 may be configured to enable low deflection tooling apparatus 902 to connect with multiple different robots or types of robots. According to such a configuration, low deflection tooling apparatus 902 may be used in different assembly operations, for example, including pre- and/or post-assembly operations. In some other embodiments, low deflection tooling apparatus 902 may be built onto or integrated with robot arm 972. For example, flange 932 may be welded to or fabricated with robot arm 972. However, the low deflection tooling apparatus 902 may be configured to be built onto or integrated with different robotic arms of different robots.

Figure 10:
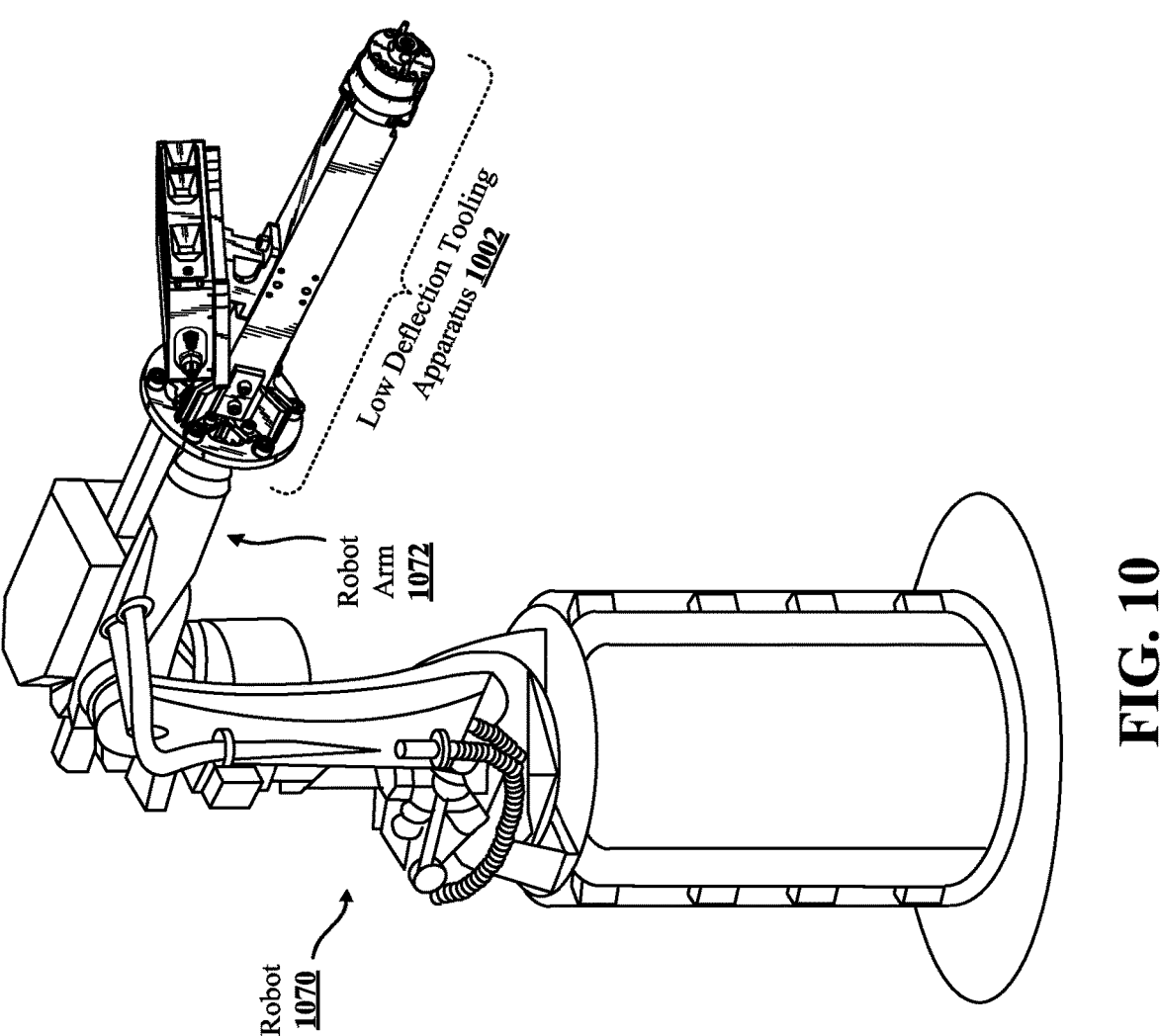
FIG. 10 illustrates an example of a low deflection tooling apparatus connected to a robot.

FIG. 10 illustrates an example embodiment 1000 of a low deflection tooling apparatus 1002 connected to a robot 1070. Robot 1070 may receive instructions from a computer system according to which robot 1070 moves robot arm 1072. Accordingly, low deflection tooling apparatus 1002 will also be moved. As low deflection tooling apparatus 1002 is narrower where EOAT retains a part, low deflection tooling apparatus 1002 may be used to reach areas with narrower or smaller clearances than were EOAT to be closer to robot arm 1072. Moreover, the stiffness of low deflection tooling apparatus 1002 may ensure that a part retained by EOAT of low deflection tooling apparatus 1002 is at position consistent with a simulation that drives an assembly process, thereby reducing errors in and increasing precision of assembly processes.

The present disclosure describes systems and apparatuses for low deflection end-of-arm tooling configured to interface with robots and/or interface with modular attachments and/or position parts within acceptable tolerances. It will be appreciated that various embodiments described herein may be practiced together. For example, an embodiment described with respect to one illustration of the present disclosure may be implemented in another embodiment described with respect to another illustration of the present disclosure.

The present disclosure is provided to enable any person skilled in the art to practice the various aspects described herein. Various modifications to these exemplary embodiments presented throughout the present disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout the present disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus comprising:
a shaft with dimensions that include a length greater than a width and having lengthwise distal and proximal ends;
a flange connected to the proximal end of the shaft, the flange being configured to interface with a robotic arm;
a tool directly connected to the distal end of the shaft, the tool including a fixtureless tooling interface configured to interface with a plurality of parts associated with vehicular assembly, and the shaft being configured to resist deformation beyond a configured amount when a respective load is applied by each part of the plurality of parts retained by the tool.

2. The apparatus of claim 1, wherein the shaft comprises a hollow structural section, a lattice structural section, or a stochastic structural section.

3. The apparatus of claim 1, wherein the length of the shaft is inclusively between 110 millimeters (mm) and 700 mm, and the width of the shaft is inclusively between 10 mm and 100 mm.

4. The apparatus of claim 1, wherein the configured amount comprises a deflection inclusively within a range of 0.025 millimeters (mm) to 0.12 mm for a load of forty (40) pounds (lbs).

5. The apparatus of claim 1, wherein the configured amount comprises an angular deflection from a neutral axis inclusively within a range of 0.2 degrees) (°) to 0.01° for a load of forty (40) pounds (lbs).

6. The apparatus of claim 1, wherein the shaft comprises a rectangular cross section.

7. The apparatus of claim 1, wherein the shaft tapers from the proximal end to the distal end.

8. The apparatus of claim 1, further comprising:
a measurement component connected with the shaft between the flange and the tool, and configured to obtain measurement data indicative of a spatial location of the tool.

9. The apparatus of claim 8, wherein the measurement component comprises at least a portion of a laser guidance system configured to position the tool.

10. The apparatus of claim 8, wherein the measurement component comprises an optical sensor angled inclusively between five (5) and thirty (30) degrees above a lengthwise neutral axis of the shaft.

11. An apparatus comprising:
a substantially straight rigidity element;
a robotic arm interface extending radially outward from one side of the rigidity element; and
a common parts interface directly connected to another side of the rigidity element, the common parts interface being fixtureless and configured to secure each of a plurality of parts through an access area to a position associated with an assembly in a robotic cell, the rigidity element being configured to avoid angular deflection greater than a known degree in response to a force applied by any of the plurality of parts that is secured by the common parts interface.

12. The apparatus of claim 11, wherein a cross section of the rigidity element comprises a stochastic structure or another spatially dependent structure.

13. The apparatus of claim 11, wherein a cross section of the rigidity element comprises a hollow opening.

14. The apparatus of claim 11, wherein at the known degree, the deflection of the rigidity element does not exceed one of 0.025 millimeters (mm), 0.05 mm, 0.0631 mm, 0.075 mm, 0.1 mm, or 0.12 mm.

15. The apparatus of claim 11, wherein the known degree is one of 0.2 degrees) (°), 0.15°, 0.1°, 0.5°, 0.05°, or 0.01° from a neutral axis of the rigidity element.

16. The apparatus of claim 11, wherein the common parts interface is removably connected to the rigidity element, and the rigidity element is configured to be connected with a plurality of parts interfaces.

17. The apparatus of claim 11, further comprising:
a laser tracking system configured to obtain spatial location data upon which positioning of the rigidity element is based.

18. An end effector comprising:
a substantially straight extension, greater in length relative to width, having a proximal end configured to be connected with an assembly robot in a robotic assembly cell, and having a stiffness coefficient sufficient to support each of a plurality of parts used for vehicular assembly in the robotic assembly cell with an angular deflection of inclusively within a range of 0.2 degrees) (°) to 0.01° from a neutral axis of the extension; and
a fixtureless vehicular part interface directly connected to a distal end of the substantially straight extension and configured for connection with each of the plurality of parts.

19. The end effector of claim 18, wherein the extension comprises a hollow structural section, a lattice structural section, or a stochastic structural section.

20. The end effector of claim 18, wherein a maximum deflection of the substantially straight extension is inclusively within a range of 0.025 millimeters (mm) to 0.12 mm.

* * * * *